United States Patent
Frederick

(10) Patent No.: US 10,539,648 B2
(45) Date of Patent: Jan. 21, 2020

(54) RFID TAG TRACKING USING PHASE LIKELIHOOD

(71) Applicant: CLAIRVOYANT TECHNOLOGY LLC, Durham, NC (US)

(72) Inventor: Thomas J. Frederick, Chapel Hill, NC (US)

(73) Assignee: Clarivoyant Technology LLC, Durham, NC (US)

(*) Notice: Subject to any disclaimer, the term of this patent is extended or adjusted under 35 U.S.C. 154(b) by 292 days.

(21) Appl. No.: 15/326,251

(22) PCT Filed: Jun. 11, 2015

(86) PCT No.: PCT/US2015/035231
§ 371 (c)(1),
(2) Date: Jan. 13, 2017

(87) PCT Pub. No.: WO2016/010653
PCT Pub. Date: Jan. 21, 2016

(65) Prior Publication Data
US 2017/0199268 A1  Jul. 13, 2017

Related U.S. Application Data

(60) Provisional application No. 62/025,166, filed on Jul. 16, 2014.

(51) Int. Cl.
*H04W 4/029* (2018.01)
*H04W 4/02* (2018.01)
(Continued)

(52) U.S. Cl.
CPC ............ *G01S 5/0294* (2013.01); *G01S 13/84* (2013.01); *G06F 17/18* (2013.01); *H04W 4/029* (2018.02); *H04W 4/02* (2013.01); *H04W 4/025* (2013.01)

(58) Field of Classification Search
CPC . H04W 4/00–043; H04W 4/185; H04W 4/30; H04W 4/33; H04W 4/38;
(Continued)

(56) References Cited

U.S. PATENT DOCUMENTS

2002/0017981 A1  2/2002  Turner
2007/0168127 A1*  7/2007  Zaruba ................... A61B 5/053
                                                                       701/500
(Continued)

FOREIGN PATENT DOCUMENTS

WO    2012155990    11/2012

OTHER PUBLICATIONS

Clairvoyant Technology LLC; International Search Report and Written Opinion for International Application No. PCT/US2015/035231 dated Aug. 27, 2015, 16 pages.
(Continued)

*Primary Examiner* — San Htun
(74) *Attorney, Agent, or Firm* — Kilpatrick Townsend & Stockton LLP

(57) ABSTRACT

RFID tag tracking according to embodiments of the invention uses apparatus and methods for tracking backscatter RFID tags using the phase and receive signal strength of the tag signal. The tag tracking in some embodiments is accomplished with a computationally efficient recursive procedure to update a tag state estimate on each new response of the tag based on the previous tag state estimate and the measured phase of the tag signal. Some embodiments use a Monte Carlo simulation based on the previous tracking algorithm state and a statistical model of the forces acting on the tag. A system according to example embodiments of the invention can include a processor connected to a quadrature mixer. The processor is operable, for example through the use of firmware or software, to estimate a tag state of an RFID tag.

21 Claims, 10 Drawing Sheets

(51) Int. Cl.
*G01S 5/02* (2010.01)
*G01S 13/84* (2006.01)
*G06F 17/18* (2006.01)

(58) Field of Classification Search
CPC . H04W 64/00; H04W 64/003; H04W 64/006; H04W 84/10; H04W 84/18
See application file for complete search history.

(56) References Cited

U.S. PATENT DOCUMENTS

| | | |
|---|---|---|
| 2008/0198903 A1 | 8/2008 | Kawai |
| 2010/0039228 A1* | 2/2010 | Sadr .................. G01S 5/12 340/10.1 |
| 2010/0079238 A1 | 4/2010 | Gravelle et al. |
| 2010/0109903 A1* | 5/2010 | Carrick .............. G01S 5/14 340/8.1 |
| 2012/0062381 A1* | 3/2012 | Liu .................... G01S 5/0252 340/572.1 |
| 2012/0139704 A1 | 6/2012 | Sadr et al. |
| 2013/0201003 A1* | 8/2013 | Sabesan ............. G01S 7/42 340/10.1 |

OTHER PUBLICATIONS

EP15822589.6 , "Extended European Search Report", dated Feb. 22, 2018, 7 pages.

\* cited by examiner

US 10,539,648 B2

RFID TAG TRACKING USING PHASE LIKELIHOOD

CROSS-REFERENCE TO RELATED APPLICATION

This application claims the benefit of International Application No. PCT/US2015/35231, filed on Jun. 11, 2015, which claims the benefit of Provisional Application No. 62/025,166, filed on Jul. 16, 2014, both of which are incorporated herein by reference.

BACKGROUND ART

Radio frequency identification (RFID) is used in a wide variety of logistics, supply chain, manufacturing, and other applications. In ultra-high frequency (UHF) backscatter RFID the read range can be 10 meters or more. In many applications it is useful to know where the tag is with higher precision than 10 meters. It may be important to know where in the interrogation zone the tag is. It may also be important to have an estimate of the tag's velocity. A common solution to this problem is to use phased array antennas which use a steerable beam to estimate the exact position and/or movement of tags. However, this is a more expensive solution which can also increase the time required to scan the interrogation zone because of the narrow beam.

DISCLOSURE OF EMBODIMENTS OF THE INVENTION

Embodiments of the present invention provide apparatus and methods for tracking backscatter RFID tags using the phase and receive signal strength of the tag signal received from one or more antennas. The apparatus according to embodiments of the invention can significantly improve the accuracy of tag position tracking without specialized phased array antennas.

An RF system according to at least some embodiments of the invention includes one or more antennas in known positions. Having more than one antenna improves the spatial diversity of the system. Regulatory environments which use narrow frequency bands or which do not use frequency hopping may require more than one antenna for diversity, particularly if there are no constraints on tag motion. Systems to read tags such as on conveyer belts or in vehicle tolling environments may operate with single antenna/single frequency because of a priori knowledge of the tags' motion.

The tag tracking design in some embodiments uses a computationally efficient recursive procedure to update the RFID tag state estimate on each new response of the tag based on the previous tag state estimate and the measured phase of the tag signal in the new tag response. A channel phase model can also be used. Some embodiments use a Monte Carlo simulation based on the previous tracking algorithm state and a statistical model of the forces acting on the tag. The tracking algorithm may use the previous tag state estimate to determine a plurality of possible actual phases of the tag signal. On each new response of the tag, the Monte Carlo simulation may generate an updated state using a random or pseudorandom set of forces drawn from the force model. The Monte Carlo simulation results may be resampled using a bootstrap sampling process using the likelihood of the phase measurement equation given the actual measured phase for each tag response. The tag state may be estimated using the updated Monte Carlo simulation outputs together with the phase likelihoods. The measured phase can be used as an assumed central location in a phase distribution in the channel phase model. The large set of tag position and velocity samples, or points, together with the likelihood of each can form an estimate of the tag's true state probability density function. Various estimators can be calculated from this estimate of the tag's true state probability density function, include the mean and variance.

Some embodiments use a bootstrap sampling process after each tag response to convert the Monte Carlo updated points to a set of likely position/velocity points by statistically removing points which are highly unlikely. The tag position and velocity estimates may be taken as the unweighted mean across the Monte Carlo points after the bootstrap sampling processing.

A system according to example embodiments of the invention includes a receive path to receive a tag signal from the RFID tag, with the receive path typically including a quadrature mixer. A processor connected to the quadrature mixer is operable, for example through the use of firmware or some other type of programming to estimate a state of an RFID tag as described herein. The system can also include a local oscillator, a modulator connected to the local oscillator, and/or an RF power amplifier to send a transmit signal to cause the tag signal to be returned from the RFID tag, although this functionality can be separate from the RF system that tracks the tag. It should also be noted that a tag might be tracked without actually decoding any RFID responses from the tag. Thus, an RF system can be implemented solely to track the position of tags without necessarily having more traditional RFID functions.

BEST MODES FOR CARRYING OUT THE INVENTION

Figure 1:
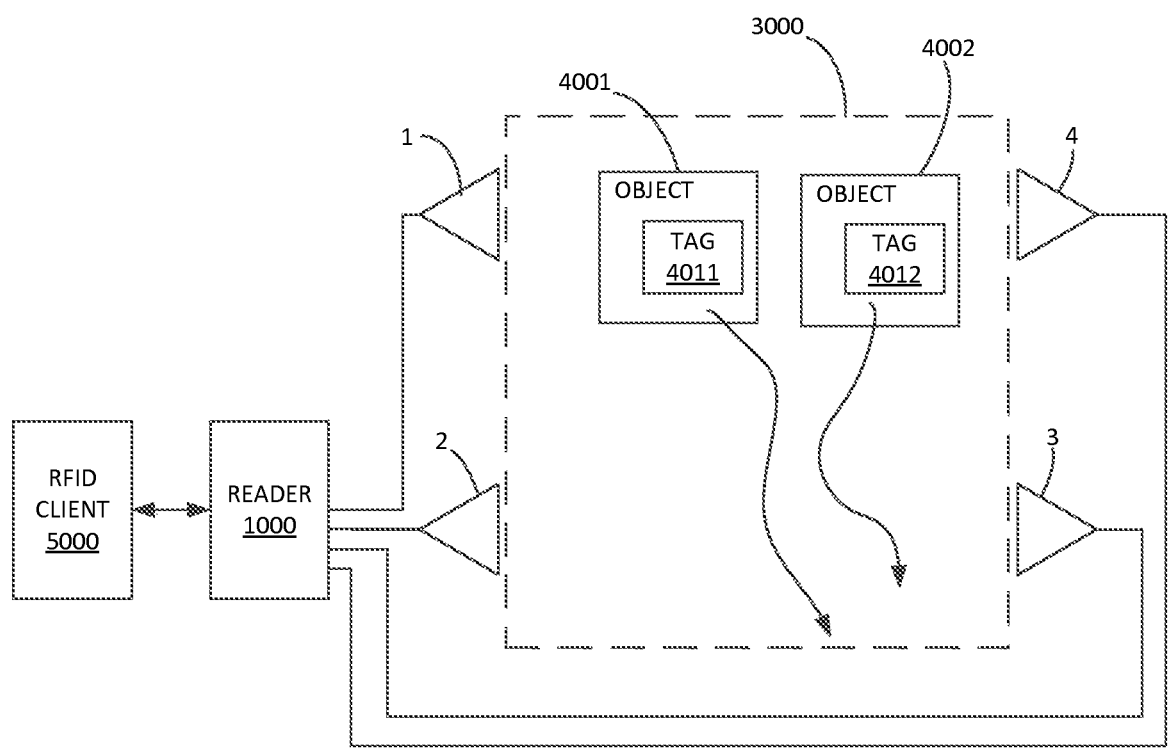
FIG. 1 is a functional block diagram of an example operating environment for an RFID system with tagged objects in motion through the interrogation zone.

Embodiments of the present invention now will be described more fully hereinafter with reference to the accompanying drawings, in which embodiments of the invention are shown. This invention may, however, be embodied in many different forms and should not be construed as limited to the embodiments set forth herein. Like numbers refer to like elements throughout.

Terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" or "comprising," when used in this specification, specify the presence of stated features, steps, operations, elements, or components, but do not preclude the presence or addition of one or more other features, steps, operations, elements, components, or groups thereof. Additionally, comparative, quantitative terms such as "above", "below", "less", "more", are intended to encompass the concept of equality, thus, "less" can mean not only "less" in the strictest mathematical sense, but also, "less than or equal to."

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein. It will also be understood that when an element is referred to as being "connected" or "coupled" to another element, it can be directly connected or coupled to the other element or intervening elements may be present.

Definitions and Notation

This subsection provides a summary of the more significant variables and functions used in this specification. These definitions all refer to tracking one specific tag, i.e., the sequence of response times $t_k$ are for a specific tag even though multiple tags may be simultaneously tracked.

"$k \in \mathbb{N}$" is the index of the tag responses for a specific tag; k is a natural number greater than or equal to zero. Tag response k=0 represents the first tag response with respect to the disclosed algorithm.

"$t_k$" is the time of the kth tag response as measured from some arbitrary reference time.

"$\tau_k = t_k - t_{k-1}$" is the time difference from tag response k-1 to tag response k.

"$f_k$" is the RFID reader carrier frequency in hertz for tag response k.

"$\omega_k = 2\pi f_k$" is the RFID reader angular carrier frequency (in radians per second) for tag response k.

"$\lambda_k$" is the RFID reader carrier wavelength (in free space) for tag response k; if "c" is the speed of light in free space then $\lambda_k = c/f_k$.

"$N_a$" is the number of antennas attached to the RFID reader.

"$a_k$" is the antenna used for tag response k, $a_k \in \{1, \ldots, N_a\}$.

"$c_a$" is the point position representation of antenna a; all positions are given as Cartesian coordinates (x, y, z) relative to the position of antenna 1, which without loss of generality is located at the origin (x, y, z)=(0, 0, 0)=$c_1$.

"$c_{a_k}$" is the position of the antenna for tag response k.

"$s_k = [x_k, y_k, z_k, \dot{x}_k, \dot{y}_k, \dot{z}_k]^T$" is the unknown position and velocity state of the tag at response k, where the superscript "T" denotes vector or matrix transpose. This is a 6×1 vector consisting of the unknown position ($x_k$, $y_k$, $z_k$) in the reference Cartesian coordinate system as well as the unknown velocity ($\dot{x}_k$, $\dot{y}_k$, $\dot{z}_k$), where the dot accent above the coordinates denote time derivative of the respective coordinate.

"$A_k$" is the known 6×6 state matrix, or simply state matrix, from tag response k-1 to tag response k.

"$B_k$" is the known 6×3 input matrix from tag response k-1 to tag response k.

"$u_k = [u_k^x, u_k^y, u_k^T]^T$" is the random force process used in the Monte Carlo simulation of the system model.

"$s_k = A_k \cdot s_{k-1} + B_k \cdot u_k$" is the system model used in the Monte Carlo simulation of the tag motion.

"$F^u(u)$" is the probability distribution of $u_k$. Typically the forces acting on the tagged object are unobservable and the true probability distribution of the force is unknown. Thus, the model distribution $F^u(u)$ is designed to match the application as closely as possible.

"N" is the number of Monte Carlo points used to simulate the tag's state progression at each tag response k.

"$n \in \{1, \ldots, N\}$" is the index used to identify the Monte Carlo point.

"$q_{k-1}^n$" denotes the nth Monte Carlo point prior to tag response k. This is a 6×1 vector consisting of a possible position and velocity. The likelihood of this Monte Carlo point is given by the phase likelihood defined below.

"$\{q_{k-1}^n\}$" denotes the set of all N Monte Carlo points prior to tag response k.

"$Q_{k-1} = \{\{q_{k-1}^n\}, t_{k-1}\}$" denotes the Monte Carlo state of the phase likelihood tracking algorithm for a tag after response k-1.

"$\tilde{q}_k^n$" denotes the nth Monte Carlo updated point at tag response k which is generated by the Monte Carlo simulation $\tilde{q}_k^n = A_k \cdot q_{k-1}^n + B_k \cdot u_k^n$, where the random or pseudorandom sample force $u_k^n$ is drawn from the probability distribution $F^u(u)$ "$\{\tilde{q}_k^n\}$" denotes the set of all Monte Carlo updated points.

"$q_k^n$" denotes the set of all N Monte Carlo points which are generated via a bootstrap resampling process of the Monte Carlo updated points $\{\tilde{q}_k^n\}$ based on the phase likelihood after tag response k as defined below.

"$K_F$" is the Rician wireless propagation channel K-factor. This parameter can be used to estimate the depth is amplitude fades and, more importantly for the disclosed algorithm, the amount of phase noise due to the channel's multipath fading.

"$R_k$" is the line of sight range from the tag position ($x_k$, $y_k$, $z_k$) to the position of antenna $a_k$ at the kth tag response.

"$\rho_k$" is the received tag power at the kth tag response. The receive tag power will generally depend on the reader's transmit power, the unknown range $R_k$, antenna gains, and the unknown wireless channel fading state.

"$RSS_k$" is the RFID reader's estimate of $\rho_k$ at the kth tag response. Note that RSS is generally understood to stand for "receive signal strength".

"$P_i$" denotes the incident RF power at the tag. Note that $P_i$ is generally time dependent due to motion of the tag, although this dependence is not explicitly shown.

"$SNR_k$" is the signal-to-noise ratio (SNR) estimate at the output of the DSP matched filter at tag response k. The SNR will typically vary from response to response because of changes in $\rho_k$ due to both tag motion and multipath fading.

"$\theta_{total}(t, R, \omega, P_i)$" denotes the overall, round trip phase shift from the reader's transmitter to the reader's receiver. This overall phase shift can be broken down into components from transmitter phase modulation, phase shift through conducted paths through the RFID radio, tag reflection phase, and channel phase shift. The channel phase shift is the component which contains all location information.

"$\theta_{ch}(R_k, \omega_k)$" denotes the line-of-sight phase shift due to the wireless propagation at tag response k. In ideal free space this is equal to $-2 \cdot \omega_k \cdot R_k/c$, where c is the speed of light. It is readily seen that this ideal free space equation depends linearly on the range $R_k$ at response k.

"$\theta_{tag}(\omega_k, P_i)$" denotes the phase shift due to the reflection phase from the tag backscatter modulation.

"$\theta_{radio}(\omega_k)$" denotes the phase shift due to the conducted path within the reader's radio electronics.

"$\varphi_k$" denotes the reader's receive phase angle measurement, sometimes computed by approximating the four quadrant arctangent of the receive matched filter output. $\varphi_k$ is an estimate of $\theta_{total}(t_k, R_k, \omega_k, P_i)$ modulo $2\pi$ at time $t_k$.

"$\theta_k$" is the RFID reader's estimate of the channel phase shift at the kth tag response. This is also referred to as the channel phase statistic. It is computed by subtracting estimates of the transmitter modulation phase, radio conduction phase, and tag reflection phase from $\varphi_k$.

"$\theta_k = h(s_k, a_k, \lambda_k) + v_k(SNR_k, K_F)$" defines the observation model wherein the phase is a function of the tag's unknown position at response k, the antenna for response k, and the wavelength at response k, plus an additive measurement noise process $v_k$.

"$h(s_k, a_k, \omega_k) = |-2 \cdot \omega_k \cdot R_k/c|_{mod\ 2\pi}$" denotes the ideal measurement model, or the ideal measurement function.

"$v_k(SNR_k, K_F)$" denotes the phase observation additive noise process.

"$F^v(v; SNR_k, K_F)$" denotes the probability distribution of the additive measurement noise process $v_k$. The notations $v_k(SNR_k, K_F)$ and $F^v(v; SNR_k, K_F)$ indicate that the probability distribution of the phase measurement noise at response k depends on $SNR_k$ and the K-factor of the Rician channel since the reflected paths will randomly perturb the phase from the ideal line-of-sight path.

"$\tilde{\theta}_k^n = h(\tilde{q}_k^n, a_k, \lambda_k)$" is the expected phase measurement assuming the nth Monte Carlo updated point at tag response k.

"$l_k^n = F^v((\tilde{\theta}_k^n - \theta_k); SNR_k, K_F)$" is the likelihood of the nth Monte Carlo updated point in at tag response k, given the actual channel phase statistic $$p_k^n = \frac{l_k^n}{\sum_{n=1}^{N} l_k^n}$$

is the probability measure of the nth Monte Carlo updated point $\tilde{q}_k^n$ at tag response k. The probability measures $p_k^n$ and Monte Carlo updated points $\tilde{q}_k^n$ form a randomly generated discrete approximation to the continuous probability density function of the true state $s_k$ at tag response index k.

$$\hat{s}_k = \frac{1}{N} \sum_{n=1}^{N} q_k^n$$

denotes one method of calculating a tag state estimate from the Monte Carlo points after boot strap sampling has been done to generate $q_k^n$ from $\tilde{q}_k^n$.

This disclosure has to do with tracking the position and velocity of backscatter RFID tags as they move through the interrogation zone. The algorithms use digital signal processing (DSP) techniques for processing the receive signal to extract amplitude and phase information. Continuous time analog signals are sampled to produce a "digital signal", which is a quantized and sampled time signal. These digital signals may be denoted such as x(n), where the argument is a variable such as n, m, or k. These variables represent the sample index, typically under a uniform sampling period $T_S$. For band limited signals there can be a one-to-one correspondence between the continuous time, continuous amplitude version x(t) and the digital signal x(n), where we have replaced the sampled time argument "n" with the continuous time argument "t". The signal name "x" remains the same to indicate the sampled time and continuous time signals represent the same signal, even though there will generally be scaling differences and small time delays in the two signal representations. This Nyquist sampling theory and practice of sampled data systems is well-known to those skilled in the art.

FIG. 1 shows a block diagram of the operating environment of an example RFID reader 1000 used for tracking tagged objects such as 4001 and 4002 within an interrogation zone 3000. Two objects are shown as an example, although the actual number of objects is arbitrary. The reader 1000 is attached to multiple antennas, where FIG. 1 shows four antennas as an example: antenna 1, antenna 2, antenna 3, and antenna 4. These antennas are typically connected to the reader using coaxial cable, although they could be connected using waveguides, microstrip, stripline, or some other means. The tagged object 4001 has RFID tag 4011 attached to it and tagged object 4002 has RFID tag 4012 attached to it. Typically there is one tag attached to each object, although in some applications there could be more than one tag attached to some items, such as when the item may be challenging to read from all angles so multiple tags are attached in different places. The RFID reader 1000 may be connected to RFID client device 5000 which uses the RFID information for some application purpose. In some embodiments of the disclosed algorithm the RFID client 5000 may execute the tag position and velocity tracking algorithm specified here. This may be done when the reader 1000 is computationally constrained and simply passes the observable information to client device 5000 which may have much higher computational resources.

All the tags such as 4011 and 4012 use the RF carrier signal from the reader 1000 as the medium to communicate back to the reader via backscatter modulation. The tags modulate their radar cross section to vary the amount of the reader's RF carrier which is reflected to the reader. This backscatter modulated RF signal may be received by one or more of the reader's antennas and passed into the RFID reader 1000 for processing. Note that although the example embodiments described herein are focused on UHF band RFID, the methods and apparatus described in the following can readily be applied to the 2.45 GHz microwave band, or other RFID readers and protocols in the UHF or microwave bands.

The RFID tags of interest such as 4011 and 4012 which are to be tracked via the disclosed position and velocity estimation algorithm are attached to physical objects such as 4001 and 4002 shown in FIG. 1. The physical objects have mass and inertia and are subject to forces which govern their motion in and through the interrogation zone 3000. The equations of motion described herein will be concerned with three dimensional translation movement in the interrogation zone. Any rotational motion about the tags' three axis will not be considered. In many applications such as conveyor belts or vehicle tolling there is very limited or no rotational motion. However, in other applications such as livestock tracking via RFID ear tags there is some amount of rotational movement in the tag. The effect of this rotational movement will be neglected other than the possible changes in reflection coefficient of the tag. These reflection coefficient changes may be caused by changing tag antenna pointing losses due to rotational movement, which in turn changes the incident power at the tag causing changes in the effective tag chip impedance. These effects are well known to those skilled in the art. Thus, henceforth when we speak of movement, acceleration, force, etc., we implicitly mean translational, not rotational, unless it is explicitly stated otherwise.

Given the specific use case of an RFID system such as in FIG. 1, we may know or assume what the maximum acceleration of the object is. The maximum acceleration may be different along different axis in the Cartesian coordinate system, such as in the use cases of conveyor belts or vehicle tolling, while other use cases have much more free movement of the tagged object such as in livestock tracking. However, even in cases such as livestock tracking where there may be substantially unconstrained movement, there are still bounds on acceleration and velocity which can be placed on the system model.

The positions for the antennas in the system are assumed known and are expressed as $c_1$ being the position of antenna 1, $c_2$ being the position of antenna 2, and more generally $c_a$ being the position of antenna a, where the position is expressed in a three dimensional Cartesian coordinate system as a 3-tuple $c_a=(x, y, z)$ of position coordinates along a reference x, y, and z axis system. Without loss of generality herein the positions will be expressed in meters, and furthermore the position of the first antenna a=1 will be taken as the origin for the system shown in FIG. 1, i.e., $$c_1=(0,0,0),$$

although other definitions are possible and do not depart from the concepts disclosed herein. This model treats the antennas as point sources which may be most accurate in the far field of the antennas. It is possible to augment the disclosed algorithm with the ability to discount or compensate for measurements made by antennas within the near field or transition region. The concepts of near field, far field, and transition region are familiar to those skilled in the art of wireless propagation and antenna theory.

With regard to the tracked objects, such as 4001 in FIG. 1, the disclosed algorithm estimates the position of the tag 4011 attached to object 4001. In effect, the tag becomes the reference point for position estimation on the object. Without loss of generality we will henceforth simply refer to tracking the tag, with it being implicit that the tag is attached to an object and therefore conveys information about the position of the tagged object. Furthermore, henceforth in this disclosure we may simply refer to "the tag" without specifically referring to tag 4011 or tag 4012 from which we are specifying the tracking algorithm for one tag in general. The RFID reader 1000 and/or client device 5000 will be able to track multiple tags simultaneously through multiple instances of the disclosed algorithm operating in software or hardware. It is possible to use very low cost RFID readers which send all information for each tag response to the RFID client 5000, including the tag identification number, the time of the current response, the tag amplitude statistic, the channel phase statistic, the RF carrier frequency, and the antenna number. The disclosed tag position and velocity tracking algorithm can then be processed on the RFID client which may be a computer with substantially more computational processing capabilities.

In order to estimate the tag position and velocity using the disclosed algorithm the tag must respond multiple times. Each tag response will be indexed sequentially using the index k which is a natural number. The time of tag response k will be denoted $t_k$, expressed in seconds. The unknown position and velocity of the tag at response k is referred to as the tag's state $$s_k=[x_k,y_k,z_k,\dot{x}_k,\dot{y}_k,\dot{z}_k]^T,$$

which a six dimensional state vector consisting of the unknown position $[x_k, y_k, z_k]^T$, and the unknown velocity $[\dot{x}_k, \dot{y}_k, \dot{z}_k]^T$ at response k. The superscript T denotes matrix transpose. The position and velocity are expressed in meters and meters per second, respectively. Note that the tag's position and velocity are not directly observable by the RFID reader 1000. The reader's only measurements regarding the tag are the amplitude and phase of the tag's signal at each response k when the tag responds to the reader. The RFID reader also knows the RF carrier frequency $\omega_k=2\pi f_k$, as well as the antenna on which the response occurred. If we define the number of antennas attached to the reader to be $N_a$, then the reader also knows which antenna $a_k \in \{1, \ldots, N_a\}$ the response k took place on and furthermore the position of that antenna $c_{a_k}$.

We may assume that an unknown force acts on the object along the x, y, and z axes. For simplicity in our model we may assume that the force is stepwise constant from time $t_{k-1}$ to time $t_k$. This does not limit the applicability of the algorithm since we are not interested in estimating the unknown force. Our stepwise constant force model denoted $u_k=[u_k^x, u_k^y, u_k^z]^T$ is such that it may yield the same motion states at times $t_k$ as the unknown continuous value force. We may express the translational movement of the tag in a linear state space model assuming tag state $s_k$ and unknown input forces $u_k$. Under the assumed stepwise constant force model the state matrix for the tag can be written $$A_k = \begin{bmatrix} 1 & 0 & 0 & \tau_k & 0 & 0 \\ 0 & 1 & 0 & 0 & \tau_k & 0 \\ 0 & 0 & 1 & 0 & 0 & \tau_k \\ 0 & 0 & 0 & 1 & 0 & 0 \\ 0 & 0 & 0 & 0 & 1 & 0 \\ 0 & 0 & 0 & 0 & 0 & 1 \end{bmatrix},$$

where $$\tau_k=t_k-t_{k-1},$$

is the time difference between tag response k and tag response k−1 which is known to the RFID reader 1000. The input matrix can be written as $$B_k = \begin{bmatrix} \frac{1}{2}\tau_k^2 & 0 & 0 \\ 0 & \frac{1}{2}\tau_k^2 & 0 \\ 0 & 0 & \frac{1}{2}\tau_k^2 \\ 1 & 0 & 0 \\ 0 & 1 & 0 \\ 0 & 0 & 1 \end{bmatrix},$$

so that in a shorthand matrix-based linear algebra notation we may write $$s_k=A_k \cdot s_{k-1}+B_k \cdot u_k.$$

The state transition equation above, together with the measurement equation derived below with respect to FIG. 2 through FIG. 6, form the basis for the Monte Carlo simulation algorithm used to estimate the tag's position and velocity.

The Monte Carlo simulation requires a statistical model of the input force process $u_k$. This model may be dependent on the forces in a particular use case and the statistical model for these forces may be developed to encompass system parameters such as minimum and maximum object mass, minimum and maximum applied forces, plus any directional constraints on the forces and movement of the object through the interrogation zone. In the example embodiments of this disclosure we assume that the forces along the three axis are independent identically distributed Gaussian random variables with zero mean and variance $\sigma_u^2$. This model assumes equal probability to move along all three axes. Note that is not a limiting aspect of the algorithm. This model of the forces can and should be tuned to the specific use case. For example, in a vehicle tolling environment it is known what direction the tag motion is most likely to occur in and that the forces acting on the object have higher variance along some vectors than others. This additional knowledge can be used to improve the tracking accuracy of the algorithm by including it in the system model. The magnitude and even the distributions of the random forces should be adapted to maximize the value of any a priori knowledge of the system in the model.

Figure 2:
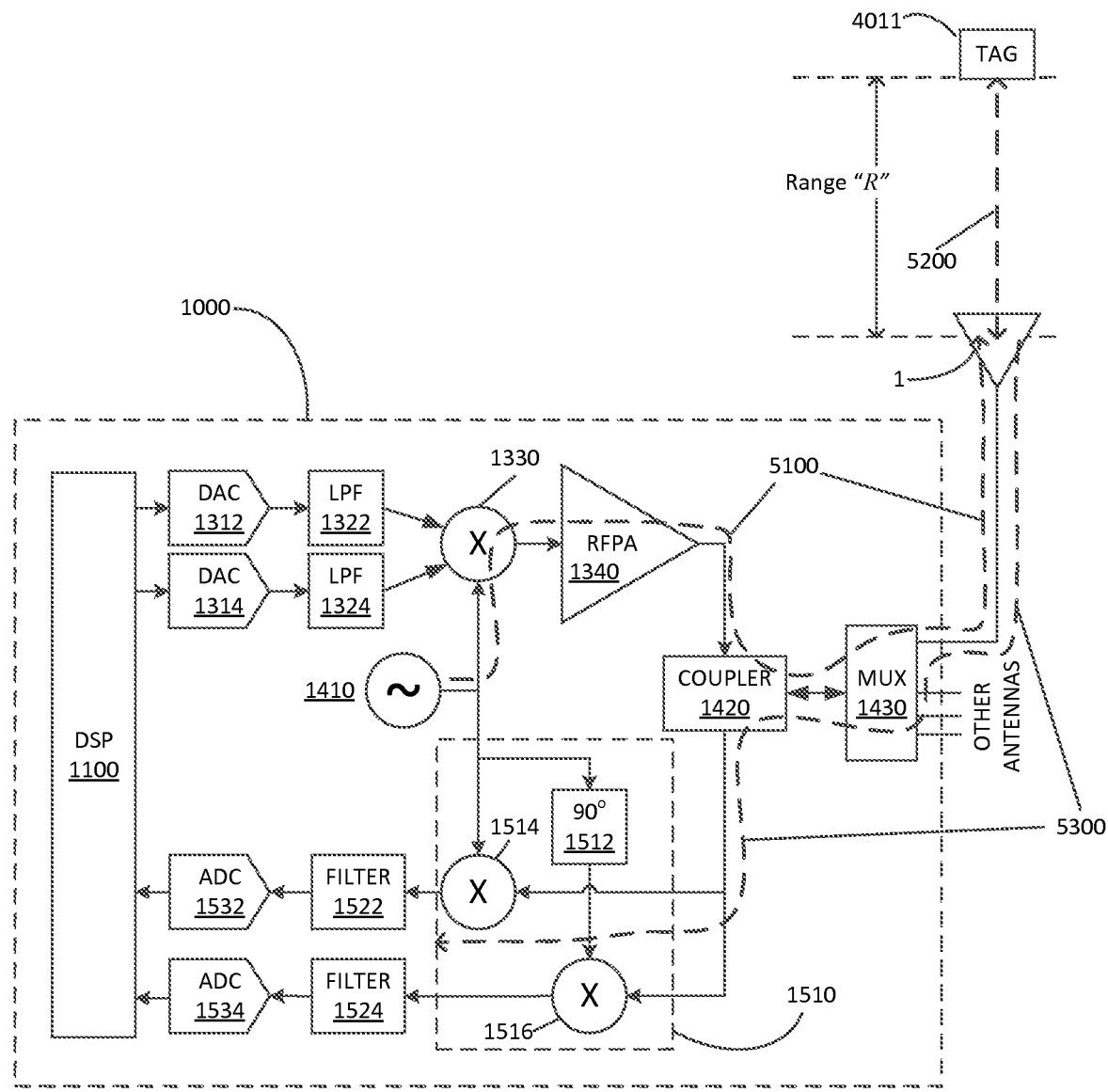
FIG. 2 is a block diagram if an RFID reader with attached antenna, a tag, and various conducted and propagated signal paths according to example embodiments of the invention.

FIG. 2 shows an example embodiment of RFID reader 1000. The DSP 1100 generates a sampled data baseband transmit signal which is coupled to the in-phase and quadrature-phase transmit DACs 1312 and 1314, respectively. The DACs 1312 and 1314 convert the in-phase and quadrature-phase sampled data transmit signals to continuous time baseband transmit signals, which are filtered and possibly amplified by in-phase and quadrature-phase lowpass filters (LPF) 1322 and 1324, respectively. The output of LPFs 1322 and 1324 are coupled to the transmit modulator 1330, also sometimes referred to as a mixer. Note that in some implementations a single baseband analog channel is used with a non-quadrature modulator. This is well known to those skilled in the art and the exact implementation is not important with respect to the tag tracking algorithm. The modulator 1330 uses a local oscillator from a frequency synthesizer 1410 to translate the baseband transmit signal to the desired RF frequency. In other implementations the baseband transmit signal can directly modulate the amplitude of the local oscillator to produce a large carrier amplitude modulated signal. Alternatively, the transmitter could be implemented without a mixer at all by using RFPA bias modulation, RFPA supply modulation or any other technique to impart the amplitude modulation required by the RFID protocol. Likewise the phase modulation could be imparted by directly modulating the phase of the local oscillator via a variable phase shifter, or by modulating the frequency synthesizer itself. The RFID embodiment shown in FIG. 2 is for illustration and alternative RFID reader architectures do not depart from the ideas disclosed herein. The exact method of generating the transmit signal is not material to the ideas disclosed herein. Indeed, some RFID protocols may not modulate the transmit signal at all, yet the concepts disclosed herein still apply.

The output of modulator 1330 is passed to an RF power amplifier (RFPA) 1340 which substantially increases the power level of the transmitter RF signal. The high power transmit signal passes from the RFPA 1340 to the coupler 1420, which passes most or all of the transmit signal through the antenna multiplexer (mux) 1430 to the currently selected antenna, which for the purposes of illustration is antenna 1 in FIG. 2. The reader 1000 is typically connected to antennas through lengths of coaxial cable, but in some embodiments the antenna(s) may be integrated into the reader printed circuit board, or yet in other embodiments the antennas may be connected to the reader 1000 through external multiplexers, usually for the purpose of providing a very high number of antenna connections to a single reader. Any of these or other means of interconnecting the reader to the antenna(s) do not depart from the concepts specified in this disclosure.

The antenna 1 acts as a transducer which converts the electrically conducted RF signal from the reader into an electromagnetically propagating wave, i.e., the antenna converts between electrical power and electromagnetic power. The transmitted electromagnetic signal travels across a distance R to the tag 4011, the distance also referred to as the range. If the tag 4011 is near enough to activate and/or decode the signal from the reader 1000, then it may respond by backscatter modulating data back to the antenna 1 across exactly the same range R. At antenna 1 the backscatter signal is converted back from an electromagnetic signal to an electrical receive signal. The backscattered signal from the tag travels back to the reader 1000 through the coaxial cable, passes back through the mux 1430 to the coupler 1420. The coupler passes the returned backscatter signal to the quadrature receive mixer 1510. The receive mixer 1510 takes the local oscillator from the frequency synthesizer 1410 and splits it into two paths; a direct path to mixer 1514 to produce an in-phase baseband output and a second path which passes through a 90 degree phase shifter 1512 to a second mixer 1516 which produces a quadrature phase baseband output. In practice the quadrature receive mixer 1510 is a single integrated circuit whose implementation details are vendor specific. Other embodiments may use a 90 degree hybrid to split the local oscillator into quadrature components. The exact implementation is not critical, as long as the receive signal from the coupler 1420 is converted to baseband such that the signal's phase angle can be estimated.

FIG. 2 shows the electrically conducted transmitter path 5100 from the local oscillator to the antenna. Without loss of generality, the frequency synthesizer produces a local oscillator signal with a baseband equivalent representation $$x_0(t) = \exp(j\theta_0),$$

where exp( ) is the exponential function, $j = \sqrt{-1}$, and $\theta_0$ is an arbitrary reference phase of the local oscillator. Baseband equivalent representations are well known to those skilled in communications and signal processing engineering. The local oscillator carrier frequency $\omega$ is typically programmable and it is implied in the baseband equivalent representation. It plays a key role in this disclosed algorithm since the phase likelihood depends on the carrier frequency. There is no explicit time dependence for the local oscillator baseband representation since there is no amplitude or phase modulation at the local oscillator output. Strictly speaking the oscillator does have low levels of amplitude and phase noise, but these noise components are not significant enough to play an explicit role in the disclosure of this tag tracking algorithm. Engineers familiar with backscatter RFID systems are familiar with the role of oscillator noise in overall RFID system design.

The local oscillator signal follows the transmit conducted path 5100 to the antenna 1 where it can be written $$x_1(t) = \exp(j(\theta_0 + \theta_{tx}(t) + \theta_{tx}(\omega))),$$

where $\emptyset_{tx}(t)$ is phase modulation imparted by the transmit modulation via DACs 1312 and 1314, $\theta_{tx}(\omega)$ is the total phase shift due to propagation through the path 5100, and the amplitude has been normalized to one. The phase shift through path 5100 is frequency dependent. While the total phase shift through path 5100 may be many radians due to the electrical length of all transmission lines and coaxial cables, plus the phase shift through all passive and active components in the path 5100, although typically only the modulo $2\pi$ part matters. The phase shift $\theta_{tx}(\omega)$ will generally be a function of the RF carrier frequency, but this effect can be calibrated out. This calibration is discussed in more detail below.

Continuing with FIG. 2, at antenna 1 the transmit signal is transformed into a propagating electromagnetic wave which travels through the wireless channel 5200 to the tag 4011, then is partially reflected back through the channel 5200 to the antenna 1. When communicating to the reader the tag 4011 will backscatter modulate so that a portion of the reflected electromagnetic energy is modulated onto a double sideband subcarrier with frequency offset $F_{mod}$ from the carrier. For backscatter RFID systems the flight time from the antenna to the tag and back again is measured in tens of nanoseconds, which is insignificant compared to the signal bandwidths of interest which are on the order of 100 KHz to 1 MHz. Therefore, this analysis will ignore the propagation times for paths 5100, 5200, and 5300, and consider only the effect of these paths on the phase shift, which is measurable and pertinent to the systems and algorithms described herein. One can write the phase shift due to the line of sight path in the channel 5200 as $$\theta_{ch}(R,\omega) = 2 \cdot \omega \cdot R/c,$$

where $\omega = 2\pi f$, f is the carrier frequency in hertz, and c is the speed of light in free space in meters per second. Note that the electromagnetic propagation path 5200 will often consist of a multitude of paths, so-called multipath. This multipath channel may consist of a line of sight path plus other paths due to reflections and scattering. The tag tracking algorithm disclosed herein will perform best when the multipath behaves as a Rician fading channel with a high K-factor, meaning there is a dominant line-of-sight path. The accuracy of the tag tracking algorithm will be degrade if the wireless channel becomes Rayleigh fading. Wireless systems engineers are familiar with the standard Rician and Rayleigh fading channel models.

The modulated backscatter signal from the tag 4011 which reaches the antenna 1 can be expressed as $$y_1(t) = B(t) \cdot \exp(j(\theta_0 + \emptyset_{tx}(t) + \theta_{tx}(\omega) + \theta_{ch}(R,\omega) + \theta_{tag}(\omega,P_i))),$$

where B(t) is the data carrying modulation of the tag backscatter and $\theta_{tag}(\omega, P_i)$ is a nuisance reflection phase shift due to the reflection coefficient of the tag which is generally dependent on both the carrier frequency $\omega$ and on the incident power $P_i$ at the tag. The tag reflection coefficient will be discussed in detail below with regard to FIG. 3. The backscatter signal is converted by antenna 1 from electromagnetic energy to electrical energy and the resulting receive signal is conducted along receive path 5300 in FIG. 2. Similar to the transmit path 5100, the receive conducted path 5300 imparts phase shift $\theta_{rx}(\omega)$ on the signal. The in-phase and quadrature-phase outputs of the receive quadrature mixer 1510 are passed through the in-phase and quadrature-phase baseband filters 1522 and 1524, respectively, before they are sampled by the in-phase and quadrature-phase analog-to-digital converters 1532 and 1534, respectively. The output of the baseband receiver filters 1522 and 1524 can be expressed in complex form as $$y_1(t) = B(t) \cdot e^{j(\emptyset_{tx}(t) + \theta_{tx}(\omega) + \theta_{ch}(R,\omega) + \theta_{tag}(\omega,P_i) + \theta_{rx}(\omega))} + v(t),$$

where we have assumed that the double RF frequency terms are eliminated by the filters 1522 and 1524, and that the receive mixer has removed the local oscillator phase $\theta_0$. The noise signal v(t) is modeled as a circularly symmetric complex additive white Gaussian noise process. In practice any phase offsets remaining are lumped into the receive path phase $\theta_{rx}(\omega)$. Let the overall phase shift from transmitter to receiver at the input to the ADCs be denoted $$\theta_{total}(t,R,\omega,P_i) = \emptyset_{tx}(t) + \theta_{tx}(\omega) + \theta_{ch}(R,\omega) + \theta_{tag}(\omega,P_i) + \theta_{rx}(\omega).$$

The baseband output signal into the DSP 1100 from the in-phase ADC 1532 and the quadrature-phase ADC 1534, respectively, can be written $$r_i(m) = B(m) \cdot \cos(\theta_{total}(t,R,\omega,P_i)) + v_i(m),$$

$$r_q(m) = B(m) \cdot \sin(\theta_{total}(t,R,\omega,P_i)) + v_q(m),$$

where m is the sample index of the ADC sampled discrete time receive signal and $v_i(m)$ and $v_q(m)$ are discrete time uncorrelated random noise processes modeled as white Gaussian noise with power spectral density $N_0$.

The DSP computes a matched filter output based on the signal B(m) which for the purposes here is assumed to be known, although in practice the DSP will need to estimate the sequence. The theory and practice of matched filters and sequence detection is well known to those skilled in the art. The matched filter output for tag response k will be denoted $M_k$ which is taken as a complex number by using the in-phase component from ADC 1532 as the real part and the quadrature-phase component from ADC 1534 as the imaginary part. The phase angle is then computed using the four quadrant arctangent $$\varphi_k = \tan^{-1}(\text{Im}\{M_k\}, \text{Re}\{M_k\}),$$

$$\varphi_k \approx \theta_{total}(t,R,\omega,P_i) \text{ modulo } 2\pi.$$

Thus, $\varphi_k$ is an estimate of $\theta_{total}(t, R, \omega, P_i)$ modulo $2\pi$ at time $t_k$. In some implementations there can be a 180 degree phase ambiguity or even 90 degree phase ambiguity due to demodulation techniques and rectifications which occur inside the DSP 1100 or receiver analog circuitry, in which case the angle is estimated modulo $\pi$ or $\pi/2$, respectively. Note that exact implementations of the inverse tangent are not necessary. Any approximation of the inverse tangent to get some measure of the baseband backscatter angle in any scaling system whatsoever is within the scope of this disclosure.

If the matched filter implementation has a processing gain G and the input signal-to-noise ratio for response k is $SNR\_IN_k$, then the signal to noise ratio out of the matched filter is $$SNR_k = G \cdot SNR\_IN_k,$$

and the variance of the phase estimate given above is $$\text{var}(\varphi_k) = \frac{1}{SNR_k}.$$

This specification will model the measurement noise for $\varphi_k$ as Gaussian. In paragraphs below a Gaussian model for the probability distribution of $\varphi_k$ will be justified. Other probability distributions are possible and may improve performance, though the underlying concepts remain the same as what is disclosed herein.

The conducted phase shift through the transmit path 5100 and the receive path 5300, $\theta_{tx}(\omega)$ and $\theta_{rx}(\omega)$, respectively, can be calibrated out as will be described in more detail later. Furthermore, the phase shift due to transmitter modulation $\emptyset_{tx}(t)$ is known to the reader 1000 and can therefore be removed from the phase estimate. The remaining nuisance parameter is the reflection phase shift $\theta_{tag}(\omega, P_i)$ due to the reflection coefficient of the tag itself. This is more difficult to calibrate out, but it is possible as will be discussed below with respect to FIG. 3 and FIG. 4. Recall that $P_i$ on which the tag reflection coefficient depends denotes the incident power at the tag. The incident power at the tag is not directly observable to the RFID reader. However, for a given tag and using monostatic antenna configurations this $P_i$ may be in one-to-one correspondence with the received tag power, denoted $\rho$ in this specification. The receive signal strength indicator, $RSS_k$, is an estimate of $\rho$ in response k. This estimate may be formed in a number of ways, including from the magnitude of the matched filter output $$RSS_k = |M_k|^2 = \operatorname{Re}\{M_k\}^2 + \operatorname{Im}\{M_k\}^2.$$

Figure 3:
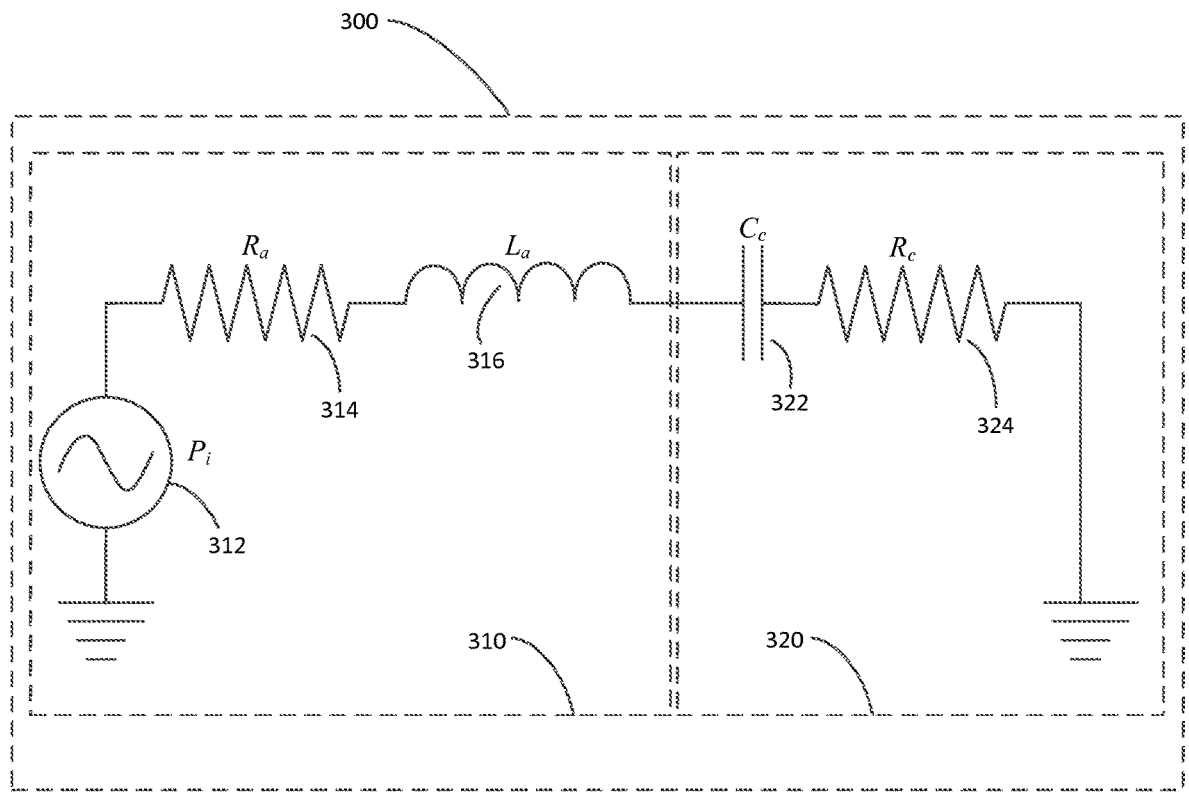
FIG. 3 is a schematic representation of an RFID tag.
Figure 4:
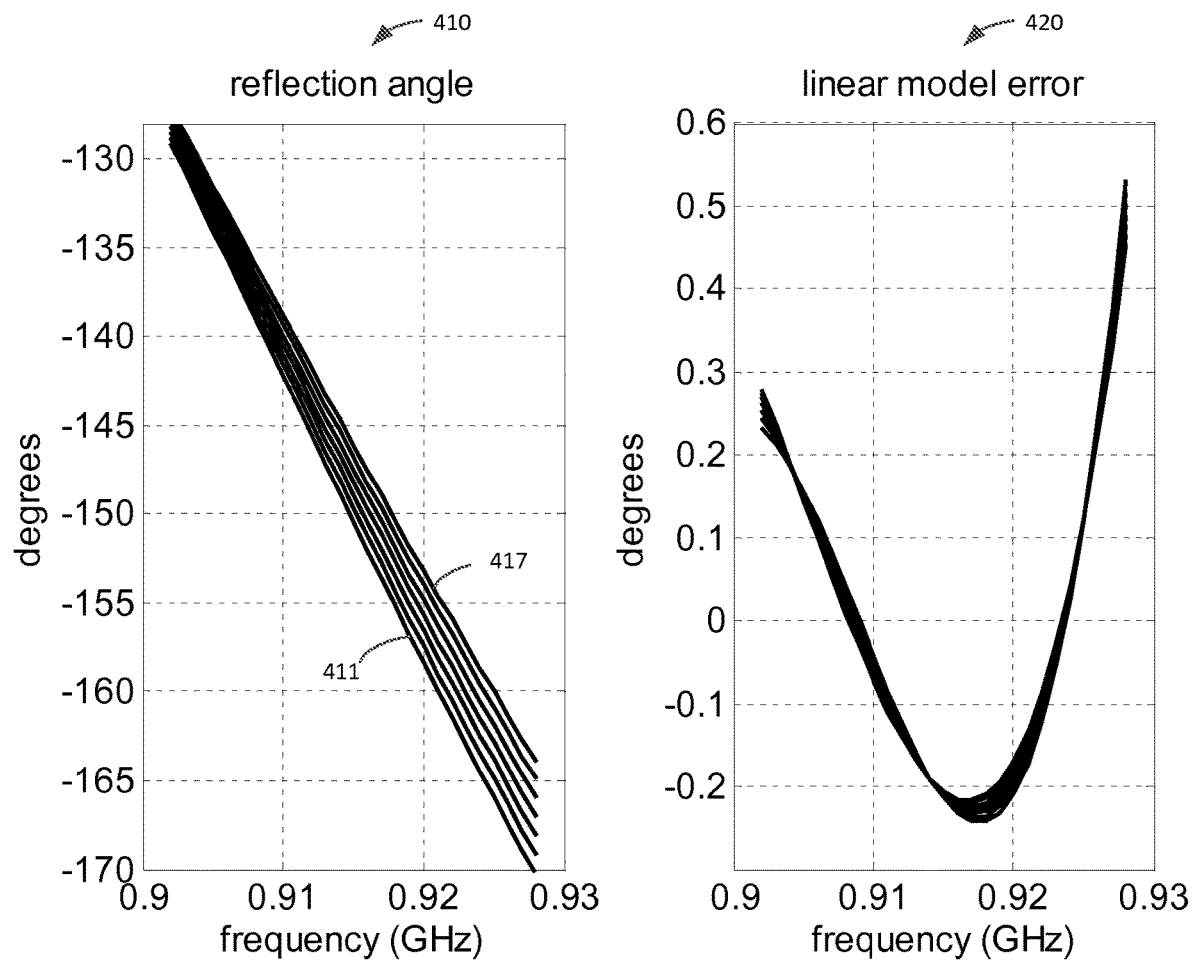
FIG. 4 are example plots FIG. 4a of tag reflection phase as a function of frequency and incident power and FIG. 4b of the phase error due to best fit linear approximations.

Therefore, the algorithm can use the known local oscillator frequency $\omega_k$ together with $RSS_k$ and tag reflection phase calibration data described with respect to FIG. 3 and FIG. 4 to remove the tag's nuisance reflection phase shift. Note that if the tag alters its radar cross section modulation depth, which may occur with some type of tags in high field strength situations, then the $P_i$ to $RSS_k$ relationship may not be one-to-one. This may be avoided by keeping the antenna ranges high enough, or other compensation techniques may be used to augment the $P_i$ estimation.

Assuming that all calibrations have been done so that the nuisance parameters can be accurately removed, then $$\theta_k = \varphi_k - \emptyset_{tx}(t_k) - \hat{\theta}_{tx}(\omega_k) - \hat{\theta}_{tag}(\omega_k, RSS_i) - \hat{\theta}_{rx}(\omega_k).$$

$$\theta_k = \varphi_k - \emptyset_{tx}(t_k) - \hat{\theta}_{radio}(\omega_k) - \hat{\theta}_{tag}(\omega_k, RSS_i),$$

where we have substituted the composite radio phase shift, $$\hat{\theta}_{radio}(\omega_k) = \hat{\theta}_{tx}(\omega_k) + \hat{\theta}_{rx}(\omega_k),$$

where $\omega_k$ is the angular carrier frequency used on tag response k.

The analysis and equations above define a model of the channel phase statistic $\theta_k$, which is instrumental in the disclosed phase likelihood based tag tracking algorithm. The phase measurement model is $$\theta_k = h(s_k, a_k, \omega_k) + v_k(SNR_k, K_F),$$

where $h(s_k, a_k, \omega_k)$ is the ideal measurement function defined as $$h(s_k, a_k, \omega_k) = |2 \cdot \omega_k \cdot R_k / c|_{mod\ 2\pi},$$

and $v_k(SNR_k, K_F)$ is the additive measurement noise process. In the disclosed embodiment the measurement noise is modeled as a zero mean Gaussian random variable with distribution $F^v(v; SNR_k, K_F)$, i.e., the variance is a function of the matched filter output SNR at response k, $SNR_k$, and the Rician propagation channel K-factor $K_F$. However, other measurement noise models may be appropriate and do not depart from the concepts disclosed herein. Recall that the range of the tag at tag response k is $R_k = |c_{a_k} - [x_k, y_k, z_k]^T|$, with $[x_k, y_k, z_k]^T$ being the tag's actual position in the reference coordinate system at response k. The ideal phase measurement function $h(s_k, a_k, \omega_k)$ produces a modulo $2\pi$ phase measure due to the line-of-sight range $R_k$.

The ideal phase measurement function $h(s_k, a_k, \omega_k)$ and the measurement noise distribution $F^v(v; SNR_k, K_F)$ are used in the disclosed tag tracking algorithm to define the phase likelihood on which the Monte Carlo based position and velocity estimator is based. This specification will describe how the phase likelihood may be computed in the RFID reader or RFID client from the inverse tangent approximation of the complex valued matched filter output, together with the known transmitter phase modulation and the calibrated radio phase shift and tag reflection phase. The measurement modulo nonlinearity above may be only $\pi$ or even $\pi/2$ depending on the demodulator implementation, but it will be shown below how to adjust the algorithm for such cases. The estimate $\theta_k$ above is the basis for the tag tracking via phase likelihood algorithm.

Before giving a detailed description of the phase likelihood tracking algorithm itself, this disclosure will describe in more detail the nature of the nuisance reflection phase shift of the tag, $\theta_{tag}(\omega, P_i)$. FIG. 3 shows a simplified electrical circuit model 300 for the backscatter RFID tag. The circuit has two parts, the antenna component 310 and the chip component 320. The antenna component 310 consists of a source 312 representing the RF incident power $P_i$ at angular frequency $\omega = 2\pi f$. The antenna is represented as a series resistance $R_a$ 314 and a matching inductance $L_a$ 316. The RFID chip 320 is modeled as a chip capacitance $C_c$ 322 in series with a load resistance $R_c$ 324. Under quiescent conditions the antenna may be nominally conjugate matched to the chip for good power transfer to the chip. The overall circuit 300 is a tuned circuit with a resonant frequency $$\omega_{res} = \frac{1}{\sqrt{L_a \cdot C_c}}$$

and the loaded quality factor is $$Q_L = \frac{1}{\omega_{res} \cdot C_c (R_a + R_c)}.$$

When the RFID chip 320 sends data back to RFID reader 1000, the chip 320 modulates the tag backscatter by changing the chip capacitance 322 which causes a change in the reflection coefficient between the chip 320 and the antenna 310, which causes varying amount of incident power to be reflected back to the reader 1000. The reflection coefficient in the quiescent matched state is $$\Gamma_q = \frac{Z_c - Z_a^*}{Z_c + Z_a},$$

where $$Z_a = R_a + j\omega L_a$$

is the complex impedance of the antenna 310, and $$Z_c = R_c + 1/i\omega C_c$$

is the complex impedance of the chip 320 in the quiescent state and * indicates complex conjugate. In the modulated state let the change in chip capacitance be denoted $\Delta C_c$, where this change in capacitance is a chip manufacturer dependent design value and can be positive or negative Then the reflection coefficient in the modulated state is $$\Gamma_m = \frac{Z_m - Z_a^*}{Z_m + Z_a},$$

where $$Z_m = R_c + 1/i\omega(C_c + \Delta C_c).$$

Note that the modulation of the chip capacitance is not explicitly shown in FIG. 3 to keep the circuit diagram simple. The complex impedances $Z_a$, $Z_c$, and $Z_m$ all explicitly depend on the carrier frequency, which is why the reflection phase shift $\theta_{tag}(\omega, P_i)$ depends of the carrier frequency.

The dependence of the receive phase on incident power $P_i$ is due to the fact that the chip load resistance 324 is actually dependent on the incident power, i.e., $R_c(P_i)$. To some extent the chip capacitance 322 may also depend on the incident power, but for simplicity and without loss of generality we will consider the incident power dependence to be due to various nonlinear voltage-current relationships in the chip's charge pump, decoder, and logic circuitry. Recall that the circuit diagram 300 is just a model used herein to develop the concept of the frequency and power dependent tag reflection phase $\theta_{tag}(\omega, P_i)$.

The change of reflection coefficient between the two states during modulation is $$\Delta\Gamma(\omega, P_i) = \Gamma_q(\omega, P_i) - \Gamma_m(\omega, P_i),$$

and the tag reflection phase is $$\theta_{tag}(\omega, P_i) = \tan^{-1}(\text{Im}\{\Delta\Gamma(\omega, P_i)\}, \text{Re}\{\Delta\Gamma(\omega, P_i)\}).$$

The resonant frequency of the tag $\omega_{res}$ is a manufacturer chosen design parameter of the tag. For common UHF RFID tags this is typically designed to have resonance somewhere in the 900 MHz to 915 MHz range.

An example FIG. 3 tag circuit model is $C_c$=0.5 picofarads, $L_a$=60.5 nano-henry, and $R_a$=$R_c(P_i)$=18 ohms nominally at an incident power $P_i$ of −10 dBm. The loaded quality factor is typically around $Q_L$=10, in this example we have 9.7 and $\omega_{res}$=$2\pi \cdot 915 \cdot 10^6$ radians per second. However, if the chip resistance $R_c(P_i)$ varies from 21 ohms to 15 ohms as the incident power varies from −18 dBm to 0 dBm, the tag's reflections coefficient can change by 5 degrees or more at a given frequency. FIG. 4 shows plots of this example. Plot 410 shows the angle of the tag reflection coefficient from 902 MHz to 928 MHz in the FCC part-15 band for various chip resistances from $R_c$=15 ohms (curve 411) to $R_c$=21 ohms (curve 417). Noting that the reflection angle appears close to linear across this bandwidth a linear model fit is used at each of these resistance levels and the resulting linear model error is shown in plot 420. It can be seen that the magnitude of the phase error is typically less than 0.5 degree for this linear phase compensation model. The example embodiment in this disclosure uses this simple linear model. However, other models such as splines of various orders or universal modeling methods such as artificial neural networks, fuzzy logic, or any number of other techniques or combinations thereof can yield a more precise fit if it is deemed that accuracy is necessary or desired. Such embodiments are still within the scope of this disclosed algorithm.

Whatever model is used for the reflection phase shift $\theta_{tag}(\omega, P_i)$ from the tag, the model must be trained or calibrated. The carrier frequency $\omega$ is known to the reader 1000, while the incident power at the tag $P_i$ must be estimated. For monostatic antenna configurations the tag power received at the reader, denoted as simply "ρ" here, is in one-to-one correspondence with the incident power $P_i$ at the tag assuming the transmit power is fixed, the tag does not alter its impedance modulation depth, antenna gains, and all cable losses are accounted for. Recall that RSS is the RFID reader's estimate of ρ. Therefore it is possible to train or calibrate a tag reflection phase shift estimate $\hat{\theta}_{tag}(\omega, \text{RSS})$ by placing the tag at an appropriate location in the interrogation zone and sweeping the reader through frequency $\omega$ and transmit power level. Unfortunately this is not possible in open systems, such as in retail supply chain, where the tag manufacturer and type is not fixed. However, in closed systems such as vehicle tolling or animal identification the tags used can be controlled so this simple tag reflection calibration procedure is possible. In open systems it would be possible for tag vendors to calibrate the tags and store the results in user data to be used in tag tracking. Alternatively, in open systems it is possible to measure the minimum activation power of a tag across the frequency band and from this information infer the resonant frequency and estimate the reflection phase angle. This disclosure applies to any of these methods or other feasible approaches.

The phase shifts due to the transmit path 5100 and the receive path 5300, $\theta_{tx}(\omega)$ and $\theta_{rx}(\omega)$, respectively, must also be calibrated out. Since these are only dependent on carrier frequency and not on transmit power, this calibration is simpler. It should be noted that the individual phase shifts $\theta_{tx}(\omega)$ and $\theta_{rx}(\omega)$ are not important as long as the sum $$\theta_{radio}(\omega) = \theta_{tx}(\omega) + \theta_{rx}(\omega),$$

can be estimated to within modulo $2\pi$. One of the easiest calibration methods is to disconnect the antenna at the end of the coaxial cable. Ideally, this will cause the conducted RF electrical signal to completely reflect from the open circuit end of the coaxial cable with no phase in the voltage waveform at the cable end. Therefore, the DSP 1100 can induce phase modulation $\emptyset_{tx}(t)$ which is measured at the receiver side of the DSP 1100, $\hat{\emptyset}_{rx}(t)$. This can be used to produce an estimate $$\hat{\theta}_{radio}(\omega) = \emptyset_{tx}(t) - \hat{\emptyset}_{rx}(t).$$

Other methods are possible, such as placing tags, whose reflection phase shifts have been previously calibrated, at one or more distances from the antenna, preferably in an RF anechoic chamber. The estimate $\hat{\theta}_{radio}(\omega)$ is then produced after removing the components due to $\emptyset_{tx}(t)$, $\theta_{ch}(R, \omega)$ and $\theta_{tag}(\omega, P_i)$. The radio conducted path calibration is a necessary step and alternative means of doing this do not depart from the tag tracking algorithm disclosed herein.

Figure 5:
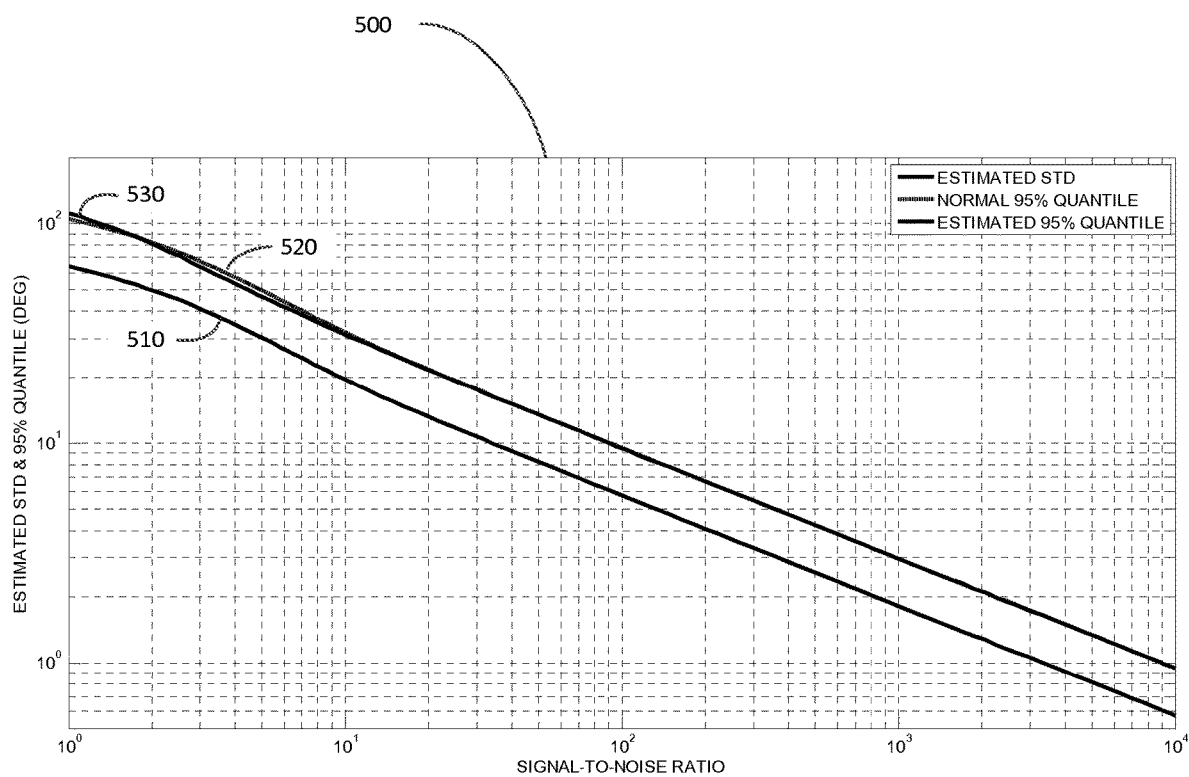
FIG. 5 is a plot of the standard deviation and 95% percentile for the channel phase statistic verses signal to noise ratio.

The raw phase statistic $\varphi_k$ for tag response k may be calculated using the arctangent of the matched filter statistic $M_k$, which is then converted to the channel phase statistic $\theta_k$ by removing the known and calibrated phase components $$\theta_k = \varphi_k - \emptyset_{tx}(t_k) - \hat{\theta}_{radio}(\omega_k) - \hat{\theta}_{tag}(\omega_k, \text{RSS}_k),$$

which is a modulo $2\pi$ estimate of the line-of-sight phase $\theta_{ch}(R_k, \omega_k)$. The variance of the raw phase statistic was given above as a function of the input signal-to-noise ratio at response k and the processing gain of the matched filter. The variance of the raw phase statistic $\varphi_k$ is the same as the variance of the channel phase statistic $\theta_k$. In the tag tracking via phase likelihood algorithm disclosed herein we must have a model probability distribution function for the channel phase statistic $\theta_k$. Since passive backscatter RFID systems are typically forward link limited, meaning the tag's minimum activation power is what limits the range $R_k$, the signal-to-noise ratio $SNR_k$ at the receiver is typically high. FIG. 5 contains plot 500 which shows the estimated standard deviation 510 of the phase statistic $\theta_k$ as a function of $SNR_k$ as well as the 95 percentile 530. In addition, the theoretical 95 percentile of a Gaussian random variable of the same standard deviation is shown in a dashed line 520. As is clearly seen, for low $SNR_k$ such as below 10 dB the statistical behavior of the phase statistic is different than Gaussian. However, above $SNR_k>10$ dB the channel phase statistic $\theta_k$ appears well modeled by a Gaussian random variable. FIG. 5 shows that by $SNR_k=30$ dB the standard deviation of the phase $\theta_k$ is less than 2 degrees.

However, there is additional uncertainty in the phase statistic $\theta_k$ due to the Rician multipath environment. The table below shows Rician K-factor vs. standard deviation of the phase statistic $\theta_k$ due solely to multipath:

| Rician K-factor | Phase statistic standard deviation |
|---|---|
| 10 dB | 13.2 degrees |
| 15 dB | 7.3 degrees |
| 20 dB | 4.1 degrees |
| 25 dB | 2.3 degrees |
| 30 dB | 1.3 degrees |

Thus, depending on the application environment adjustments can be made to the probability model of the phase statistic for the phase likelihood tag tracking algorithm. The Rician K-factor of the interrogation zone may be measured using a site survey, or the RFID reader 1000 can adaptively estimate the K-factor using the statistical properties of the channel phase statistic $\theta_k$. These methods are known to those skilled in the art, or alternative methods may be devised. However the Rician K-factor is determined, the use of this parameter in modeling the probability distribution of the channel phase statistic is fundamentally disclosed herein.

Figure 6:
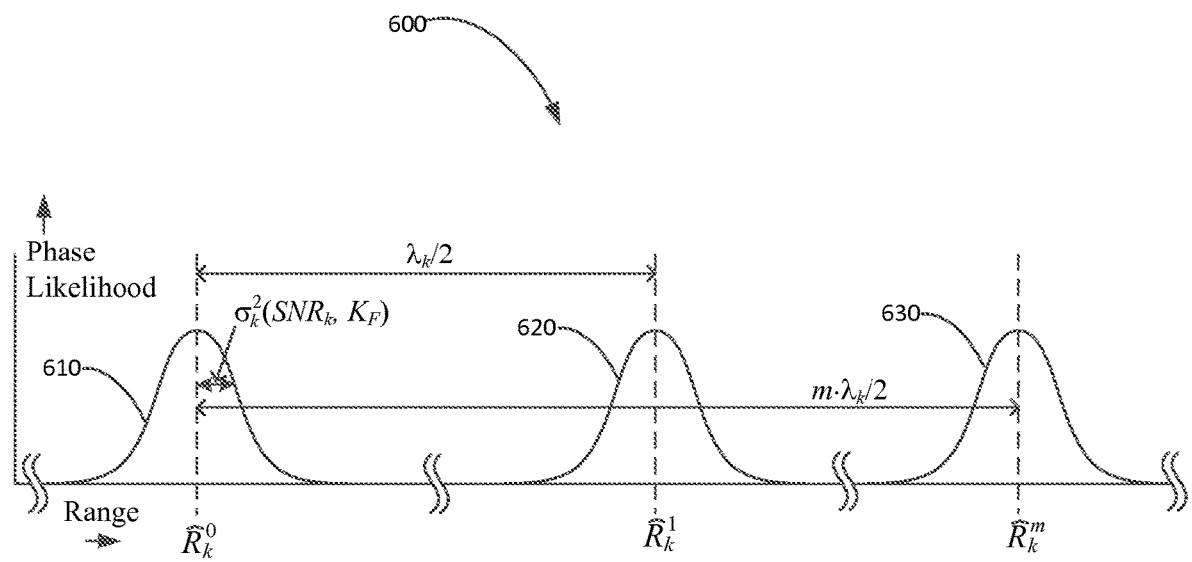
FIG. 6 is a diagram illustrating the phase likelihood function as a function of range.

Because the channel phase statistic $\theta_k$ is a modulo $2\pi$ estimate of $\theta_{ch}(R_k, \omega_k)$, the channel phase statistic creates a range ambiguity wherein each $2\pi$ radians of $\theta_{ch}(R_k, \omega_k)$ representing $\lambda_k/2$ meters of range $R_k$ between the antenna and the tag is equally likely. This is illustrated in FIG. 6 with respect to the phase likelihood function. Given a phase measurement, the range inferred would be $$\hat{R}_k^m = \left(\frac{\theta_k}{2\pi} + m\right) \cdot \frac{\lambda_k}{2},$$

where m is any natural number, including zero. The diagram 600 shows a train of Gaussian distribution functions with means $\hat{R}_k^m$ for $m \geq 0$ each with variance $$\text{var}(\theta_k) = \sigma_k^2(SNR_k, K_F) = \text{var}(F^\nu(v; SNR_k, K_F)),$$

recalling that $F^\nu(v; SNR_k, K_F)$ is the model of the distribution from which the measurement noise process $v_k$ is drawn. The first distribution 610 is centered at mean $\hat{R}_k^0$, with each subsequent Gaussian distribution $\lambda_k/2$ further along the range axis. Henceforth we will assume the phase statistic $\theta_k$ is modulo $2\pi$ although as previously discussed this is dependent on the receiver and demodulator design. Some implementations may be limited to modulo $\pi$ or even modulo $\pi/2$, but the adjustments necessary to the disclosed algorithm is simply to change $\lambda_k/2$ in the formula for $R_m$ to $\lambda_k/4$ or $\lambda_k/8$, respectively. Those skilled in the art will understand this adjustment.

The set of ranges $\{\hat{R}_k^m\}$ given by the equation above define a set of "spherical shells" of diameters $\hat{R}_k^m$ with a common center at $c_{a_k}$, the position of the antenna $a_k$ used to measure $\theta_k$. Each spherical shell has a Gaussian distribution defining the a priori likelihood for the tag position in the region of the shell. However, if one were to express the tag position in spherical coordinates, the likelihood function gives absolutely no information about position in terms of the polar angle or azimuthal angle. Every angle is equally likely for the same range. The only positional information conveyed from the phase statistic $\theta_k$ is regarding range, and the modulo $2\pi$ nonlinearity induced by the inverse tangent function (or its approximation) produces an "infinite" chain of these likelihood spherical shells whose position depend on the location of the antenna and the wavelength of the RF carrier.

The tag signal measurement model, calibration, and phase compensation techniques have been disclosed and described in detail with respect to FIG. 2, FIG. 3, FIG. 4, FIG. 5, and FIG. 6. The method of iteratively estimating a tag state of an RFID tag based on phase likelihood will now be described in detail. The disclosed algorithm is an iterative process, with a new iteration of the algorithm occurring for each tag response. For ease in disclosing the algorithm, the current discussion is only concerned with steady state operation, meaning that for now we are assuming that when a specific tag responds, say tag 4011, that it has been read before and there exists a current state estimate for tag 4011. For a tag first entering the interrogation zone the state estimate must be generated via an initialization process, which will be discussed in later paragraphs. The following description will be broken into steps only to make the process more clear.

Step 1: Tag Response Signal Measurement

The method iteratively determines a measured phase $\varphi_k$ and the receive signal strength $RSS_k$ of a received tag signal at each tag response k using the receiver of RFID reader 1000. At each iteration, the measured phase $\varphi_k$ is a combination of the actual, but unknown, channel phase $\theta_{ch}(R_k, \omega_k)$ of the tag signal propagation path plus noise $v_k(SNR_k, K_F)$ and offsets $\theta_{radio}(\omega_k)$ and $\theta_{tag}(\omega_k, P_i)$. The noise is due to noise in the radio electronics as well as noise from the Rician multipath environment. The offset in the measured phase is due to a phase shift in the radio electronics due to conducted paths 5100 and 5300 in FIG. 2, as well as due to the reflection coefficient of the tag 300 which is plotted in 410 for one example in FIG. 4. The offsets may be mitigated by compensating the phase measurement using calibration data for the conducted path phase shift $\theta_{radio}(\omega_k)$ and tag reflection coefficient $\theta_{tag}(\omega_k, P_i)$ as described next.

Step 2: Phase Compensation Using Calibration Data

The offset due to the conducted paths is removed by subtracting the estimate $\hat{\theta}_{radio}(\omega_k)$ from the measured phase at response k. The calibration procedure for measuring the offset due to the conducted paths 5100 and 5300 was discussed in relation to FIG. 2. The iterative tag state estimation method ideally calculates a phase compensation $\hat{\theta}_{radio}(\omega_k)$ to subtract from the measured phase $\varphi_k$. The phase compensation is based on stored electrical path phase shift calibration data for the tag signal, including the transmit path 5100 which is the signal path before the tag imparts its backscatter modulation. This type of calibration and compensation will be understood by those skilled in the art.

The offset due to the tag reflection coefficient is dependent on the incident power at the RFID tag and the carrier frequency $\theta_{tag}(\omega, P_i)$, as discussed in reference to the tag model 300 in FIG. 3. The offset is compensated for by subtracting the estimate $\hat{\theta}_{tag}(\omega_k, RSS_k)$ as discussed with reference to plots 410 and 420. This phase compensation $\hat{\theta}_{tag}(\omega_k, RSS_k)$ is based on the estimated reflection coefficient of the RFID tag as a function of the incident power at the tag, which can be estimated using the receive signal strength $RSS_k$. Thus, the tag reflection coefficient estimate is adjusted according to the incident power level at the RFID tag as estimated from the receive signal strength estimate. The estimated reflection coefficient can be readily calculated from stored calibration data similar to that shown plotted in 410.

After the phase compensation is completed by subtracting the estimated offsets and any known transmitter modulation phase $\emptyset_{tx}(t_k)$, the measured phase $\varphi_k$ is converted to the channel phase statistic $\theta_k$, $$\theta_k = \varphi_k \emptyset_{tx}(t_k) - \hat{\theta}_{radio}(\omega_k) - \hat{\theta}_{tag}(\omega_k, RSS_k),$$

which is a modulo $2\pi$ estimate of the line-of-sight phase $\theta_{ch}(R_k, \omega_k)$, $$\theta_k = \theta_{ch}(R_k,\omega_k)|_{mod\ 2\pi} + v_k(SNR_k,K_F).$$

Note that we have assumed the receiver phase estimator is capable of a modulo $2\pi$ estimate of the signal phase, although as previously discussed other modulo estimates are also possible such as $\pi$ or even $\pi/2$, depending on the receiver implementation. The equation above is of importance to the algorithm since it represents the measurement model which maps the tag range R to the observed phase $\theta$. This is the channel phase model 600 in FIG. 6 comprising a modulo function of a fraction of the RF carrier wavelength. This channel phase model, comprising a sum of periodically spaced distribution functions 600, is used to compute phase likelihoods of the output of a Monte Carlo simulation used in the iterative tracking algorithm as described next with reference to FIG. 7.

Step 3: Monte Carlo Simulation Update

Figure 7:
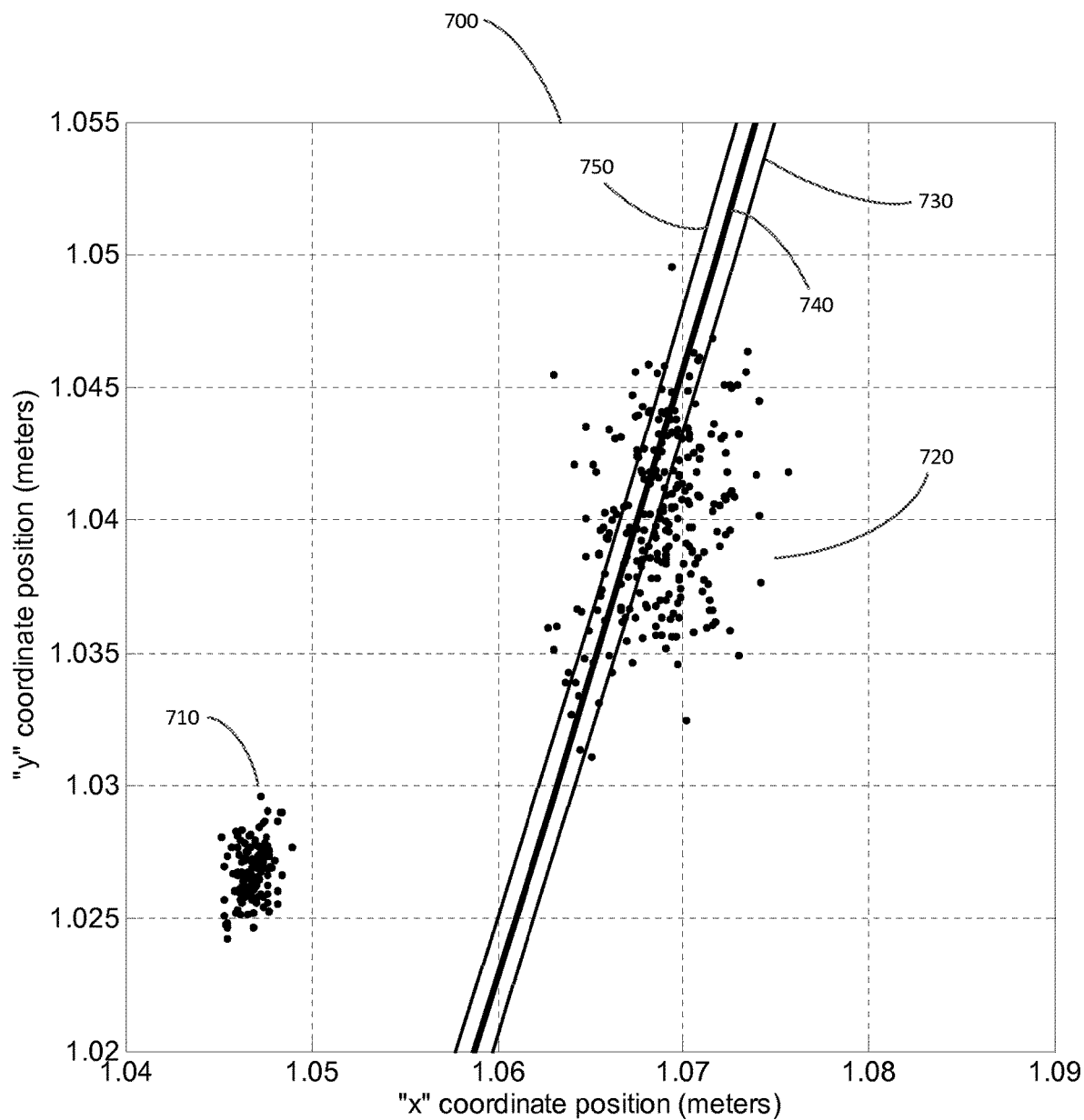
FIG. 7 is a plot illustrating a Monte Carlo simulation for a single response to update $\{q_{k-1}{}^n\}$ to $\{\tilde{q}_k{}^n\}$.

In order to ease visualization of the algorithm, FIG. 7 is projected onto two spatial dimensions, x and y. However, the concepts disclosed herein are more typically applied in full three dimensional space and those skilled in the art can readily extend the concepts described herein. For ease of disclosing the algorithm, the current discussion is only concerned with tracking one specific tag moving in the interrogation zone 3000. While the reader is capable of tracking a plurality of tags, it does so by maintaining a separate Monte Carlo state for each tag individually. This per tag state information will include the time of the last response for said tag, $t_{k-1}$, as well as position and velocity estimate information. Therefore, each time a tag responds the identity of that tag is used to access that particular tag's prior state information and update the state estimate using new information from response k.

When in steady state, the iterative state estimation algorithm is based on Monte Carlo methods. Specifically, we define a collection of N Monte Carlo points $q_{k-1}^n$, $n \in \{1, \ldots, N\}$, which are the prior results from tag response k−1 at time $t_{k-1}$. Each of these points represent a possible actual value of the true but unknown tag state $s_{k-1}$. Thus, each Monte Carlo point $q_{k-1}^n$ is a six dimensional vector consisting of position and velocity in the Cartesian coordinate system used by the reader. FIG. 7 illustrates this concept in plot 700 using a projection onto the x-y plane. On plot 700 the cluster of dots 710 represents the set of prior Monte Carlo points $\{q_{k-1}^n\}$ from response k−1. Each dot is placed at the (x,y) point position. For tag response k the disclosed algorithm computes the time difference $\tau_k$ from the previous response and from this computes the state matrix $A_k$ and input matrix $B_k$ as defined in detail above. Next, the disclosed algorithm updates each of the Monte Carlo points according to $$\tilde{q}_k^n = A_k \cdot q_{k-1}^n + B_k \cdot u_k^n,$$

where $u_k^n$ is a random or pseudorandom force vector drawn from the use case dependent probability distribution $F^u(u)$. This represents a Monte Caro simulation of the tag's motion from response k−1 to response k. This set of Monte Carlo updated points $\{\tilde{q}_k^n\}$ is represented by cluster 720 on plot 700. Note that it is typical for the Monte Carlo updated points $\{\tilde{q}_k^n\}$ 720 to be spread more randomly due partially to the influence of the random force input $\{u_k^n\}$ and also to the variations in the velocity estimates of $\{q_{k-1}^n\}$ 710.

Step 4: Map Monte Carlo Update Points to Possible Actual Phases

Figure 8:
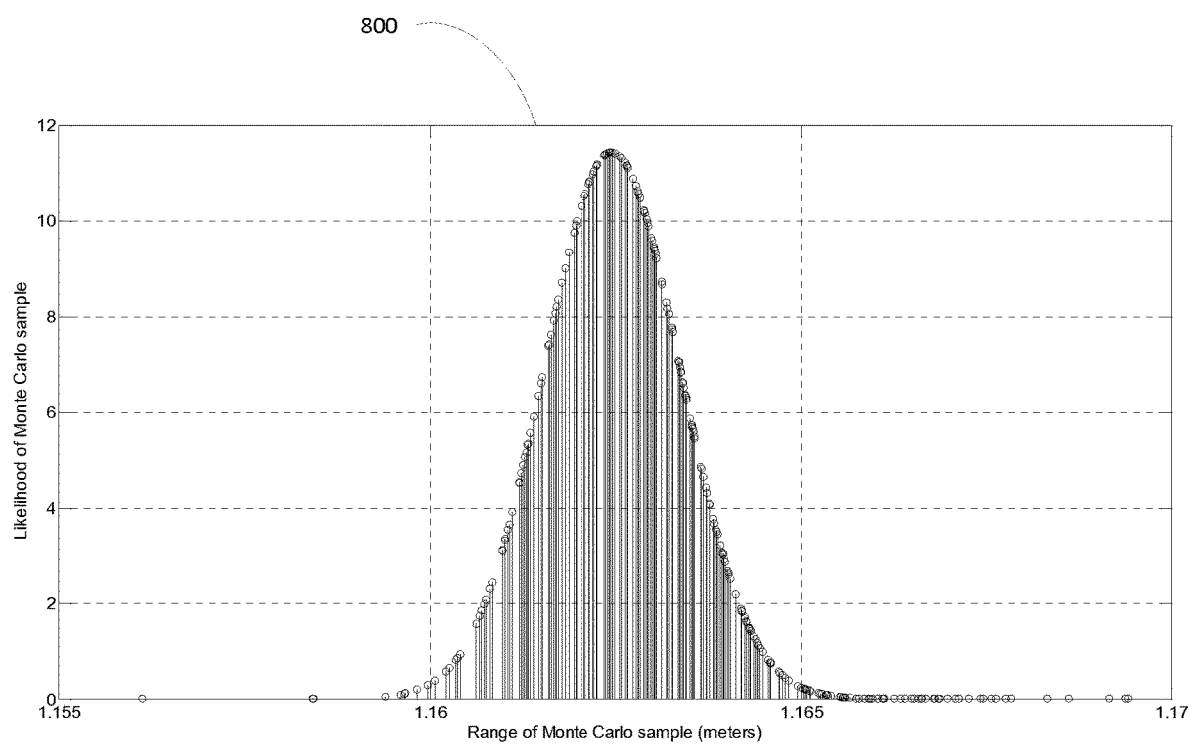
FIG. 8 is a plot showing an example phase likelihood mapping for the Monte Carlo updated state $\{\tilde{q}_k{}^n\}$.

The iterative tag state estimation algorithm has thus far comprised an RSS and phase measurement, phase compensation, and a Monte Carlo simulation at the current tag response iteration k. The next step in the algorithm is to map the plurality of updated tag states 720 each to one of a plurality of possible actual phases, which is illustrated in FIG. 8 by plot 800. Recall that each updated Monte Carlo point $\tilde{q}_k^n$ is a six dimensional vector with the first three components representing its Cartesian coordinates. These coordinates are used to map to a range $$\tilde{R}_k^n = |c_{a_k} - [\tilde{x}_k^n, \tilde{y}_k^n, \tilde{z}_k^n]^T|,$$

and these ranges are then mapped to a plurality of possible actual phases $$\tilde{\theta}_k^n = |2 \cdot \omega_k \cdot \tilde{R}_k^n / c|_{mod\ 2\pi} = |4\pi \cdot \tilde{R}_k^n / \lambda_k|_{mod\ 2\pi} = h(\tilde{q}_k^n, a_k, \lambda_k),$$

an example of which is plotted in 800 for the iteration updated points 720. This equation represents a noiseless measurement model of how the point $\tilde{q}_k^n$ maps to an ideal phase measurement assuming the position in $\tilde{q}_k^n$, the antenna $a_k$, and the wavelength $\lambda_k$. In other words, $\tilde{\theta}_k^n$ is the exact line-of-sight propagation phase if the tag were located at the position in the point $\tilde{q}_k^n$ and there were no measurement noise due to the Rician channel fading or $SNR_k$. The actual possible ranges are calculated from the antenna position $c_{a_k}$ and the position coordinates updated Monte Carlo states 720, then these actual possible ranges are mapped to actual possible channel phase statistics as a modulo function of the RF carrier wavelength $\lambda_k$. For the measurement and Monte Carlo iteration illustrated in FIG. 7, the possible actual phases $\tilde{\theta}_k^n$ are shown on the horizontal axis of plot 800 in FIG. 8.

Step 5: Map Possible Actual Phases to Phase Likelihoods

The plurality of updated Monte Carlo points $\tilde{q}_k^n$ are next assigned likelihoods by mapping the possible phases $\tilde{\theta}_k^n$ using the phase model distribution $F^v(v; SNR_k, K_F)$ located at the measured channel phase statistic $\theta_k$ for the current iteration, as shown in plot 800 of FIG. 8. The location of the distribution $F^v(v; SNR_k, K_F)$ may use $\theta_k$ as the mean, median, mode, or any number of other central location possibilities. The above embodiment of the algorithm assumes that the measured channel phase statistic $\theta_k$ is the most likely phase value of the distribution 800. In the example embodiment shown in 800 a Gaussian distribution is used with the measured phase statistic $\theta_k$ as the central location value and the distribution variance is computed from the estimated signal-to-noise ratio at iteration k and the Rician channel model, $$l_k^n = F^v((\tilde{\theta}_k^n - \theta_k); SNR_k, K_F),$$

where $\theta_k$ is subtracted in the argument of the probability distribution function since the phase measure noise process $v_k$ is zero mean. Plot 800 illustrates ideal measurement function outputs $\tilde{\theta}_k^n$ verses the phase likelihood outputs $l_k^n$ corresponding to the cluster 720 in FIG. 7 in relation to the closest range $\hat{R}_k^m$ 740. Arc 740 represents the cross section of the spherical likelihood shell, with dashed lines 730 and 750 representing the 5 percentile and 95 percentile lines of the distribution. This example embodiment assumes the likelihood spherical shell has a Gaussian distribution, with the central moment, mean, or peak value occurring at $\hat{R}_k^m$ 740. Thus, the closer the position in $\tilde{q}_k^n$ is to the arc 740, the higher the phase likelihood $l_k^n$ is, or stated another way, the closer $\tilde{\theta}_k^n$ is to $\theta_k$, the higher the phase likelihood. The width of the phase distribution, as measured by the standard deviation, is a function of $SNR_k$ and $K_F$, which is modeled in the distribution $F^\nu(v; SNR_k, K_F)$. The phase probability distribution does not need to be Gaussian. Other probability distributions may be used as appropriate without departing from the fundamental ideas conveyed herein.

Step 6: Resample to Generate Final Monte Carlo Iteration k State

After the complete set of phase likelihoods $\{l_k^n\}$ has been generated from the N Monte Carlo updated points for tag response k, the probability measures for each Monte Carlo updated point can be calculated as $$p_k^n = \frac{l_k^n}{\sum_{n=1}^{N} l_k^n},$$

from which it can be readily verified that $$\sum_{n=1}^{N} p_k^n = 1,$$

which is to say that the set of probability measures $\{p_k^n\}$ is an estimate of the probabilities of $\{\tilde{q}_k^n\}$.

It often happens that some of the Monte Carlo updated points $\tilde{q}_k^n$ have extremely low probability measures. The points with very low probability measures are of little value since they will likely continue to diverge further from the true tag state $s_k$. It is therefore beneficial to perform a bootstrap resampling of the Monte Carlo updated points before finishing the algorithm for the current tag response event. This resampling is done by randomly drawing N points from $\{\tilde{q}_k^n\}$ according to the probability distribution $\{p_k^n\}$, with repeated draws allowed. The result of this resampling is the final Monte Carlo state $\{q_k^n\}$ for the phase likelihood tag tracking for tag response k. Note that because the algorithm allows repeats in the resampling process, it is possible and indeed typical for updated points $\tilde{q}_k^n$ with high probability measures $p_k^n$ to be repeated multiple times in the set $\{q_k^n\}$. This set is subsequently used for the next tag response event k+1 to repeat the process again. Resampling does not have to be done on every tag response and could be performed as needed when the algorithm determines too many points have low probability, or according to some other rule.

Step 7: Compute Tag State Estimate for Iteration k

The final step in the algorithm for tag response k is to calculate the unweighted average $$\hat{s}_k = \frac{1}{N} \sum_{n=1}^{N} q_k^n$$

which is our estimate of the tag state at tag response k. This estimator assumes the bootstrap sampling has been performed at each tag response. If resampling is not done each response, possibly to reduce computations, then the probability measures must be factored in such as $$\hat{s}_k = \frac{1}{N} \sum_{n=1}^{N} q_k^n \cdot p_k^n$$

and $\{q_k^n\}=\{\tilde{q}_k^n\}$ for the next tag response. In conclusion, the method outlined in the steps above use a channel phase model 600 to produce the current iteration tag state from a plurality of possible actual phases 800 of the tag signal.

Figure 9:
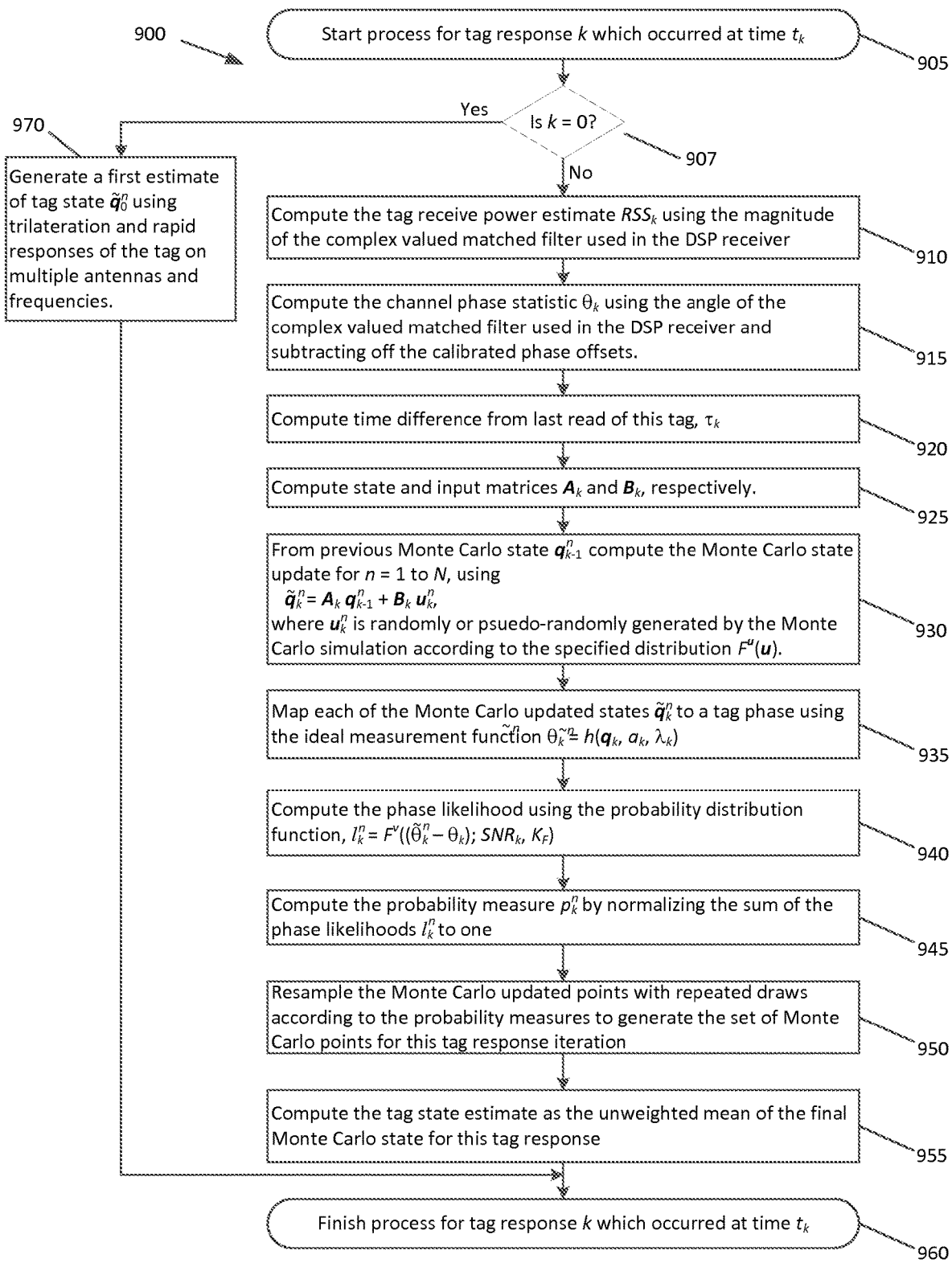
FIG. 9 is a flowchart documenting the iterative tag state estimation based on phase likelihood algorithm.

FIG. 9 presents a flowchart 900 for the overall algorithm. Flowchart 900 illustrates the algorithm which estimates a tag state at the current iteration from the phase of the tag signal at the current iteration together with the prior iteration's estimate of the tag state. Flow chart 900 provides a method of iteratively measuring the tag response signal and updating the tag state estimate using the new signal measurement information and the previous tag state estimate comprising the plurality of Monte Carlo points. The algorithm starts at step 905 for a tag which has responded the kth time at time $t_k$. At step 907, the algorithm checks if this tag has a previous iteration state or if this is the first read (k=0) and the first estimate of the tag state must be generated. If this is the first time that this tag has been read in the interrogation zone, then the algorithm proceeds to step 970 where the tag state is initialized. This process will be described in more detail below. If, at step 907, it is determined that this is not the first response from this tag, then the algorithm proceeds to step 910. At step 910 the tag receive power is estimated using the magnitude of the complex valued matched filter output. Step 915 is the phase measurement iteration wherein the channel phase statistic is computed via an inverse tangent approximation of the complex valued matched filter output and subtracting the calibrated phase offsets due to the radio conducted path, the transmitter modulation, and the tag reflection phase. At step 920 the time difference between the current response and the previous response of this tag is calculated. At step 925 the state and input matrices are calculated. At step 930 the Monte Carlo state from the previous response $\{q_{k-1}^n\}$ is updated to produce $\{\tilde{q}_k^n\}$ using a random or pseudo-random set of inputs $\{u_k^n\}$ drawn from the assumed probability distribution $F^u(u)$. At step 935 the Monte Carlo updated point are mapped using the measurement function to the possible actual phase outputs $\tilde{\theta}_k^n = h(\tilde{q}_k^n, a_k, \lambda_k)$. At step 940 the set of ideal measurement function outputs $\{\tilde{\theta}_k^n\}$ are used to compute the set of phase likelihoods $\{l_k^n\}$. At step 945 the algorithm computes the probability measures by normalizing the phase likelihoods. At step 950 the algorithm resamples the Monte Carlo updated points according to the computed probability measure to generate the set of Monte Carlo points $\{q_k^n\}$ at tag response k. At step 955 the tag state estimate $\hat{s}_k$ is calculated as an unweighted mean of the final Monte Carlo state. At step 960 the algorithm is finished with the iterative tag state estimation based on phase likelihood.

Note that resampling of step 950 does not need to be done on every iteration, but is done so here for simplicity in the algorithm description. Other methods could be devised to reduce how frequently the resampling occurs, but this type of variation does not depart from the algorithm disclosed herein. If a resampling is not done at tag response k, then the Monte Carlo updated points become the new simulation points $q_k^n = \tilde{q}_k^n$.

Figure 10A:
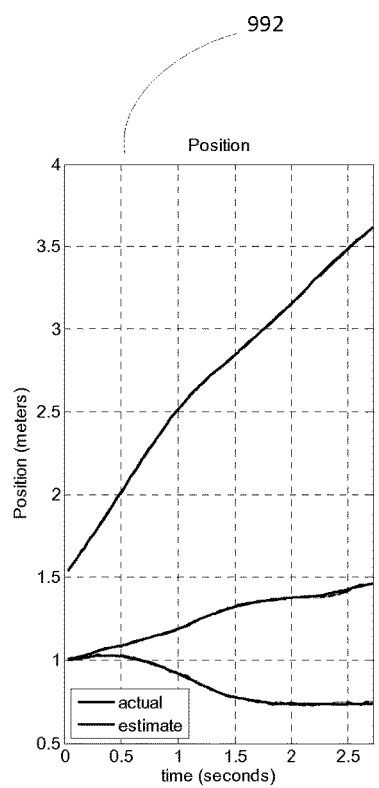
FIG. 10 is a set of plots illustrating the results of the iterative tag state estimation based on phase likelihood algorithm. The plots are presented as FIG. 10A, FIG. 10B, and FIG. 10C.
Figure 10B:
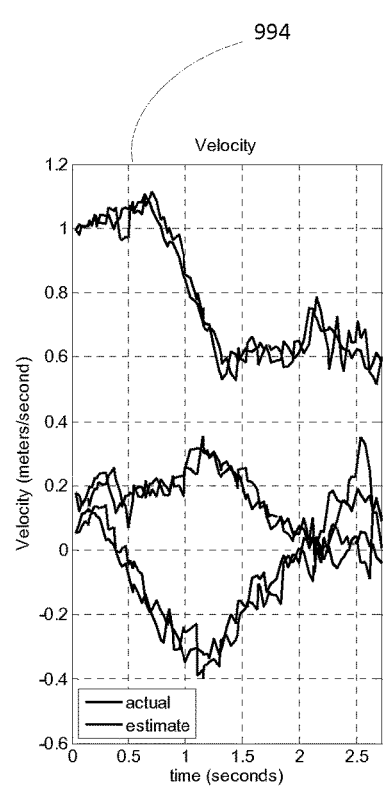
Figure 10C:
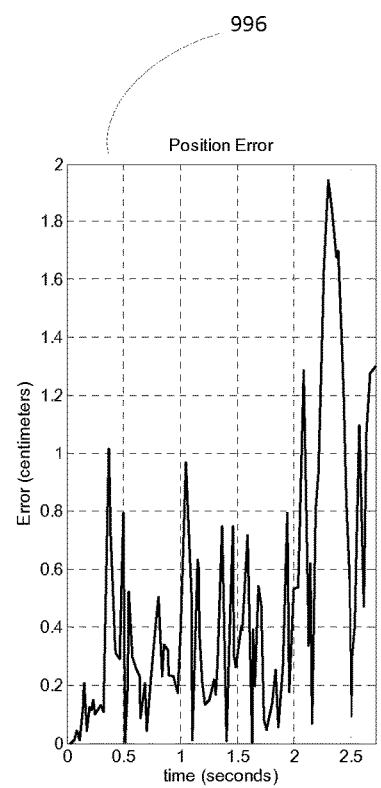

FIG. 10 shows the results of a simulation of a tag entering the interrogation zone at 1 meter per second plus random forces on all three axis. The tag response intervals $\tau_k$ varied via a uniformly random process in the range of 10 milliseconds to 50 milliseconds. Note that faster sampling rates (i.e., shorter time intervals between tag responses) will yield better tracking due to the lower spread from the unknown acceleration. This implies degraded performance when there is a very high number of tags being tracked simultaneously in the interrogation zone. For this simulation, the tag was read once on each antenna, then the reader sequenced to the next antenna. Plot 992 of FIG. 10A shows the actual position for all three coordinates, x, y, and z, together with the estimated positions via the disclosed tag tracking via the disclosed phase likelihood method. On the scale of plot 992, the actual and estimated positions are nearly on top of each other and therefore difficult to distinguish. Plot 994 of FIG. 10B shows the actual velocity for all three coordinates, x, y, and z, together with the estimated velocities via the disclosed tag tracking via the disclosed phase likelihood method. Finally, plot 996 of FIG. 10C shows the absolute value of the position error, i.e.

$$\sqrt{(x_k-\hat{x}_k)^2+(y_k-\hat{y})^2+(z_k-\hat{z}_k)^2}.$$

For this simulation the total absolute position error is typically in the range of about 1 centimeter.

The iterative tag tracking algorithm via phase likelihood has been described in detail in the specification. The disclosed algorithm takes the prior Monte Carlo state from the previous response $\{q_{k-1}^n\}$ and $t_{k-1}$, then updates it with new information of response k at $t_k$ of measured phase, RSS, antenna number, and wavelength, to produce $\{q_k^n\}$ as well as the tag position and velocity state estimate. The algorithm byproduct of the probability measure $\{p_k^n\}$ also can serve as a measure of the statistical variance or confidence in the tag position/velocity estimates.

When the tag enters the interrogation zone at the first response k=0 the iterative process must be initialized by some mechanism as illustrated in step 970 of FIG. 9. This can be done by a number of techniques. For example, the newly arrived tag could be made to respond in rapid succession at multiple frequencies on each of the antennas which provides an estimate of range from each antenna via the equation $$R = \frac{\theta_{ch}(R, \omega) \cdot c}{-2 \cdot \omega},$$

then trilateration can be used to get the initial position estimate. Also, the newly arrived tag could be made to respond in rapid succession at the same frequency on each of the antennas which provides an estimate of radial velocity with the initial Cartesian velocity estimate being solved for algebraically or in a least squares sense. This type of technique would neglect other tags while the new tag is repeatedly responding for the initial state estimate, from which $\{q_1^n\}$ can be generated via a Monte Carlo perturbation.

Another technique is to use a very high number of Monte Carlo points during the initialization sequence, in other words $N_{INIT} \gg N$ so that the initial position and velocity uncertainty can be accommodated. The number of Monte Carlo points can be reduced algorithmically as the confidence in the state estimate improves. This techniques can be combined with the previously mentioned technique of rapidly measuring the same tag on various frequencies and antennas to acquire extra information by making it to respond repeatedly.

The example devices and methods in this disclosure can track moving tags in the interrogation zone with high accuracy than any previously proposed algorithm. This algorithm has broad commercial value across many sectors. Given the long read range of backscatter RFID systems, localizing the tag position and estimating its velocity is a key enabling technology for a wide array of new features in RFID.

In some embodiments, a general-purpose processor such as a DSP, microcontroller or microprocessor is used and non-transitory firmware, software, or microcode can be stored in a tangible storage medium that is associated with the device. Any such device may be referred to herein as a "processor" or a "microprocessor." Such a medium may be a memory integrated into the processor, or may be a memory chip that is addressed by the controller to perform control functions. Such firmware, software or microcode is executable by the processor and when executed, causes the processor to perform its control functions. Such firmware or software could also be stored in or on a tangible medium such as an optical disk or traditional removable or fixed magnetic medium such as a disk drive used to load the firmware or software into an RF system. The components of the RF system with the software provide the means to carry out embodiments of the invention.

It should be noted that any data and information necessary to support the execution of instructions for any embodiment of the disclosure can be placed in a removable storage medium as well. These could be stored on a disk as well, especially for development purposes or for maintenance and update purposes. Such a storage medium may be accessed either directly or over a network, including the Internet.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A method of iteratively estimating a tag state of an RFID tag wherein the tag state includes a position and a velocity in a coordinate system, the method comprising:
   recursively determining a measured phase of a tag signal at an RFID receiver by making a plurality of phase measurements;
   at each phase measurement, determining a plurality of possible actual phases of the tag signal from a prior estimate of the tag state;
   producing a channel phase model including a sum of periodically spaced distribution functions based on a modulo function of a fraction of an RF carrier wavelength;
   recursively updating a current tag state estimate to produce a plurality of updated tag states;
   mapping the plurality of updated tag states, each to one of the plurality of possible actual phases;
   using the measured phase as an assumed central location in a phase distribution in the channel phase model to produce a plurality of phase likelihoods; and using the plurality of phase likelihoods associated with the updated tag states to produce the current tag state estimate.

2. The method of claim 1 further comprising producing the plurality of updated tag states using a Monte Carlo simulation.

3. The method of claim 2 wherein the Monte Carlo simulation uses a statistical model of forces acting on the RFID tag.

4. The method according to claim 1 further comprising:
estimating a receive signal strength to produce a receive signal strength estimate; and
using the receive signal strength estimate to adjust the channel phase model.

5. The method according to claim 4 further comprising adjusting a channel phase model variance according to a measurement signal-to-noise ratio model.

6. The method according to claim 4 further comprising adjusting a tag reflection coefficient estimate according to incident power level at the RFID tag as estimated from the receive signal strength estimate.

7. The method according to claim 1 further comprising calculating a phase compensation based on a calibrated phase shift due to an electrically conducted path of a transmit signal.

8. The method according to claim 1 further comprising calculating a phase compensation based on a calibrated or estimated reflection coefficient of the RFID tag as a function of incident power at the RFID tag.

9. The method according to claim 1 further comprising:
resampling the plurality of updated tag states; and
normalizing prior to producing the current tag state estimate.

10. The method according to claim 1 further comprising generating a first estimate of the tag state when the RFID tag enters an interrogation zone.

11. The method according to claim 1 wherein determining the measured phase further comprises splitting the signal into in-phase and quadrature phase components.

12. A radio frequency (RF) system to estimate a tag state of an RFID tag wherein the tag state includes a position and a velocity in a coordinate system, the system comprising:
a local oscillator;
a modulator connected to the local oscillator;
an RF power amplifier connected to the modulator to send a transmit signal to cause a tag signal to be returned from the RFID tag;
a receive path to receive a tag signal from the RFID tag, the receive path including a quadrature mixer; and
a processor connected to the quadrature mixer, the processor operable to recursively determine a measured phase of the tag signal by making a plurality of phase measurements, determine a plurality of possible actual phases of the tag signal using a prior estimate of the tag state, produce a channel phase model including a sum of periodically spaced distribution functions based on a modulo function of a fraction of an RF carrier wavelength, and recursively update a current tag state estimate to produce a plurality of updated tag states, map the plurality of updated tag states, each to one of the plurality of possible actual phases, use the measured phase as an assumed central location in a phase distribution in the channel phase model to produce a plurality of phase likelihoods, and produce the current tag state estimate using the plurality of phase likelihoods.

13. The RF system of claim 12 further comprising a coupler connected to the quadrature mixer and the RF power amplifier.

14. The RF system of claim 12 wherein the processor is further operable to produce the plurality of updated tag states using a Monte Carlo simulation.

15. The RF system of claim 14 wherein the Monte Carlo simulation uses a statistical model of forces acting on the RFID tag.

16. The RF system according to claim 12 wherein the processor is further operable to estimate a receive signal strength to adjust the channel phase model.

17. The RF system according to claim 12 wherein the processor is further operable to calculate a phase compensation based on a calibrated phase shift due to an electrically conducted path of a transmit signal.

18. The RF system according to claim 12 wherein the processor is further operable to calculate a phase compensation based on a calibrated or estimated reflection coefficient of the RFID tag as a function of incident power at the RFID tag.

19. The RF system according to claim 12 wherein the processor is further operable to generate a first estimate of the tag state when the RFID tag enters an interrogation zone.

20. Apparatus for estimating a tag state of an RFID tag wherein the tag state includes a position and a velocity in a coordinate system, the apparatus comprising:
means for recursively determining a measured phase of a tag signal at an RFID receiver;
means for determining a plurality of possible actual phases of the tag signal from a prior estimate of the tag state;
means for producing a plurality of updated tag states by recursively updating a current tag state estimate;
means for mapping each of the plurality of updated tag states to one of the plurality of possible actual phases;
means for producing a plurality of phase likelihoods using the measured phase as an assumed central location in a phase distribution; and
means for producing the current tag state estimate using the plurality of phase likelihoods associated with the updated tag states.

21. The apparatus of claim 2 wherein the means for producing the plurality of updated tag states uses a Monte Carlo simulation.

* * * * *